US012658362B2

(12) United States Patent
Boldrini

(10) Patent No.: US 12,658,362 B2
(45) Date of Patent: Jun. 16, 2026

(54) METHOD TO MANUFACTURE A COIL AROUND A COMPONENT OF AN ARTICLE

(71) Applicant: G.D SOCIETA' PER AZIONI, Bologna (IT)

(72) Inventor: Fulvio Boldrini, Bologna (IT)

(73) Assignee: G.D SOCIETA' PER AZIONI, Bologna (IT)

( * ) Notice: Subject to any disclaimer, the term of this patent is extended or adjusted under 35 U.S.C. 154(b) by 785 days.

(21) Appl. No.: 17/974,037

(22) Filed: Oct. 26, 2022

(65) Prior Publication Data

US 2023/0135607 A1 May 4, 2023

(30) Foreign Application Priority Data

Oct. 26, 2021 (IT) ........................ 102021000027422

(51) Int. Cl.

*H01F 41/06* (2016.01)
*A24F 40/10* (2020.01)
*A24F 40/42* (2020.01)
*A24F 40/70* (2020.01)
*H01F 41/09* (2016.01)
*H01Q 1/36* (2006.01)

(52) U.S. Cl.

CPC .............. *H01F 41/06* (2013.01); *A24F 40/10* (2020.01); *A24F 40/42* (2020.01); *A24F 40/70* (2020.01); *H01F 41/09* (2016.01); *H01Q 1/36* (2013.01); *Y10T 29/49071* (2015.01)

(58) Field of Classification Search

CPC .......... A24F 40/70; A24F 40/42; H01F 41/06; H01F 41/09; H01Q 1/36; Y10T 29/49071; B65G 54/02

See application file for complete search history.

(56) References Cited

U.S. PATENT DOCUMENTS 3,410,317 A 11/1968 Rondas
4,732,338 A 3/1988 Eminger et al.
(Continued)

FOREIGN PATENT DOCUMENTS

DE 19848009 A1 4/2000
GB 839162 A 6/1960
(Continued)

OTHER PUBLICATIONS

Lin et al, "Exploring the construction mode of smart factory in cigarette enterprises," 2021 IEEE International Conference on Power, Intelligent Computing and Systems (ICPICS), Shenyang, China, 2021, pp. 207-211. (Year: 2021).*
(Continued)

*Primary Examiner* — A. Dexter Tugbang

(74) *Attorney, Agent, or Firm* — MARSHALL, GERSTEIN & BORUN LLP

(57) ABSTRACT

Method to manufacture a coil around a component of an article having the steps of: moving by means of a main conveyor and along a working path, a carriage provided with a seat designed to house the component; placing, in an input station arranged along the working path, the component in the seat of the carriage; and coupling, in a winding station arranged along the working path downstream of the input station, a wire around the component in order to obtain a series of turns making up the coil.

13 Claims, 26 Drawing Sheets

(56) References Cited

U.S. PATENT DOCUMENTS

| | | | | |
|---|---|---|---|---|
| 4,817,888 | A * | 4/1989 | Arnold | H01F 41/09 242/437.2 |
| 2009/0151153 | A1* | 6/2009 | Liu | Y10T 29/49071 29/605 |
| 2019/0118984 | A1 | 4/2019 | Vecchietti et al. | |
| 2019/0152627 | A1 | 5/2019 | Ghiotti et al. | |
| 2019/0378642 | A1* | 12/2019 | Sukegawa | H01F 41/06 |
| 2020/0328662 | A1 | 10/2020 | Rissi et al. | |
| 2021/0155422 | A1* | 5/2021 | Kastinger | B65G 54/02 |

FOREIGN PATENT DOCUMENTS

| | | | |
|---|---|---|---|
| JP | S61251015 | A | 11/1986 |
| JP | 2018074664 | A * | 5/2018 |
| WO | WO-2020/152583 | A1 | 7/2020 |

OTHER PUBLICATIONS

European Patent Application No. 22203235.1, Extended European Search Report, dated Mar. 15, 2023.
Italian Search Report and Opinion for Corresponding Italian Patent Application No. 102021000027422 dated Jun. 7, 2022.
Italian Search Report and Opinion for Corresponding Italian Patent Application No. 102021000027428 dated Jun. 9, 2022.
Italian Search Report and Opinion for Corresponding Italian Patent Application No. 102021000027434 dated May 18, 2022.

* cited by examiner

METHOD TO MANUFACTURE A COIL AROUND A COMPONENT OF AN ARTICLE

CROSS-REFERENCE TO RELATED APPLICATIONS

This patent application claims priority from Italian patent application no. 102021000027422 filed on Oct. 26, 2021 the entire disclosure of which is incorporated herein by reference.

TECHNICAL FIELD

The present invention relates to a method and a machine to manufacture a coil around a component of an article.

The present invention finds advantageous application in the tobacco industry for the assembly of a transponder in a component of a disposable cartridge of an electronic cigarette, to which the following disclosure will refer without losing generality.

PRIOR ART

Normally, an electronic cigarette comprises a reusable part that is used several times and contains, among other things, an electric battery (which provides the energy necessary for the operation of the electronic cigarette) and an electronic processor that oversees the operation of the electronic cigarette. Furthermore, the electronic cigarette comprises a single use cartridge (namely, disposable that is therefore used only once and is then replaced), which is coupled to the reusable part.

Recently it has been proposed to insert, in each disposable cartridge, a component provided with a transponder provided with a memory in which the characteristics of the disposable cartridge are stored and in particular the characteristics of the active substance (liquid or solid) that must be heated to release the inhalable vapours; in this way, the reusable part of the electronic cigarette can read the characteristics of the disposable cartridge coupled thereto, thus adapting the heating to the characteristics of the disposable cartridge.

In most applications, the transponder comprises a single helical antenna (namely, a single coil acting as an antenna); however, in some applications the transponder can comprise a plurality of helical antennas (namely, a plurality of coils acting as an antenna) which have different orientations in space so as to guarantee the transponder to be able to communicate effectively in all possible positions.

A significant problem in making a helical antenna (namely, a coil that acts as an antenna) for a transponder is the need to use a very thin wire (having a diameter of the order of 50-200 microns) which therefore has an extremely low mechanical resistance (the breaking load is of the order of a few Newtons): if, during the winding of the wire, even a modest increase in traction occurs (2-3 Newton in excess are enough), there is a risk of breaking the wire with the consequent stop of the automatic machine until the intervention of an expert operator (who in any case, takes several minutes to restore the continuity of the wire). Obviously, each stop of the automatic machine significantly reduces the daily productivity of the automatic machine and, at the same time, increases the direct costs of managing the automatic machine as a result of the intervention costs of an expert operator.

Patent application US2020328662A1 describes a winding machine for winding coils and comprising at least one housing for the body of the coil and at least one feeding unit for feeding the winding material; in a first setting and by using a first receiving unit, the winding is carried out according to a first winding technique while, in a second setting and by using a second receiving unit, the winding is carried out according to a second winding technique.

Patent application DE19848009A1 describes a method to manufacture a coil connected to a chip module for contactless chip card application.

DESCRIPTION OF THE INVENTION

The object of the present invention is to provide a method and a machine to manufacture a coil around a component of an article, which method and machine allow to work at a high operating speed (measured as the number of components produced in a unit of time) while maintaining, at the same time, a high production quality (generally measured as a percentage of defective pieces) and above all without frequent breakage of the wire during winding.

According to the present invention, a method and a machine are provided to manufacture a coil around a component of an article, as claimed in the attached claims.

The claims describe preferred embodiments of the present invention forming an integral part of the present description.

BRIEF DESCRIPTION OF THE DRAWINGS

The present invention will now be described with reference to the attached drawings, which illustrate a non-limiting embodiment thereof, wherein.

PREFERRED EMBODIMENTS OF THE INVENTION

Figure 1:
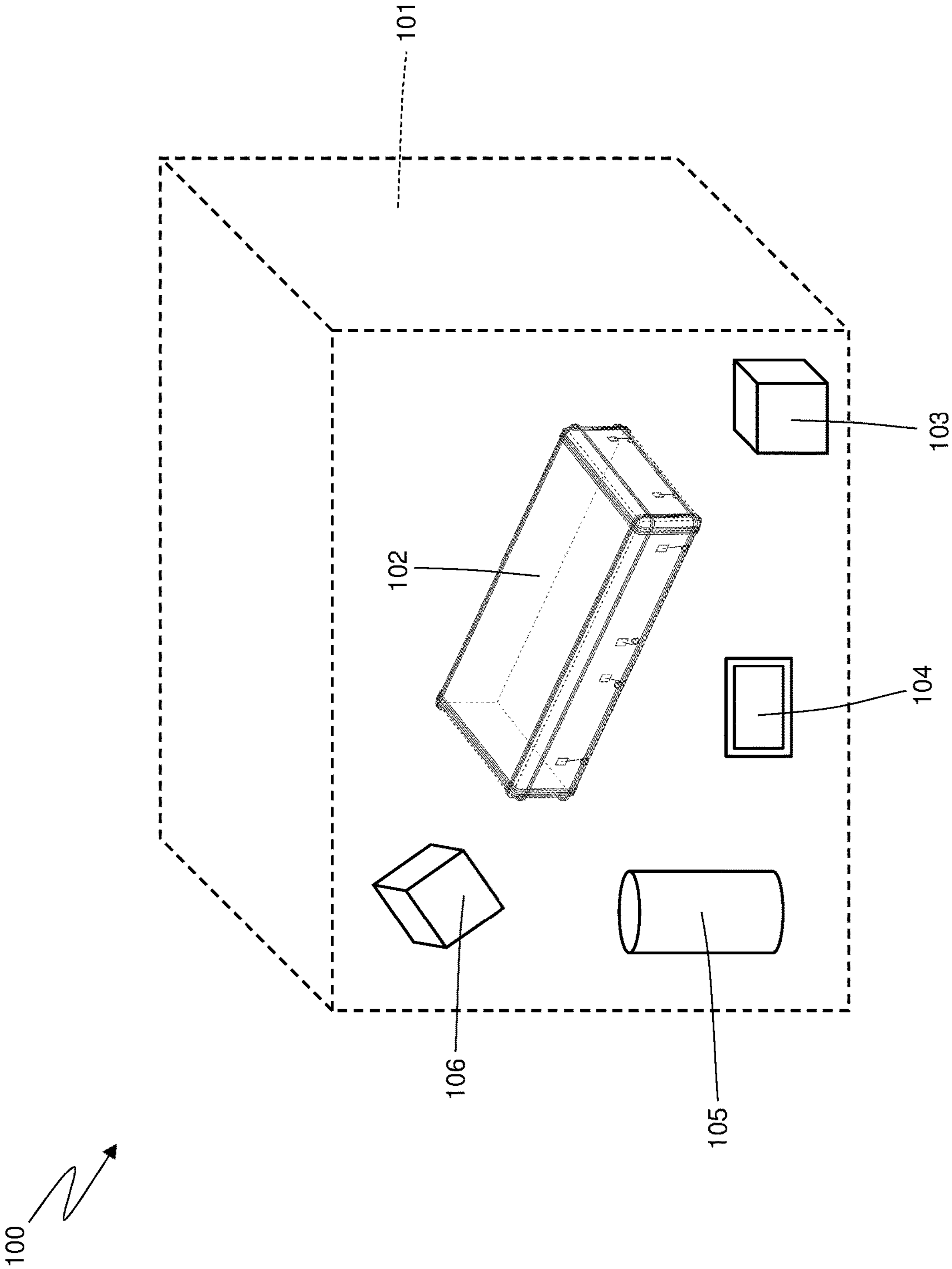
FIG. 1 is a schematic view of a disposable cartridge of an electronic cigarette.

In FIG. 1, the reference number 100 denotes schematically and as a whole a disposable cartridge of an electronic cigarette comprising a series of components 101-106.

Figure 2:
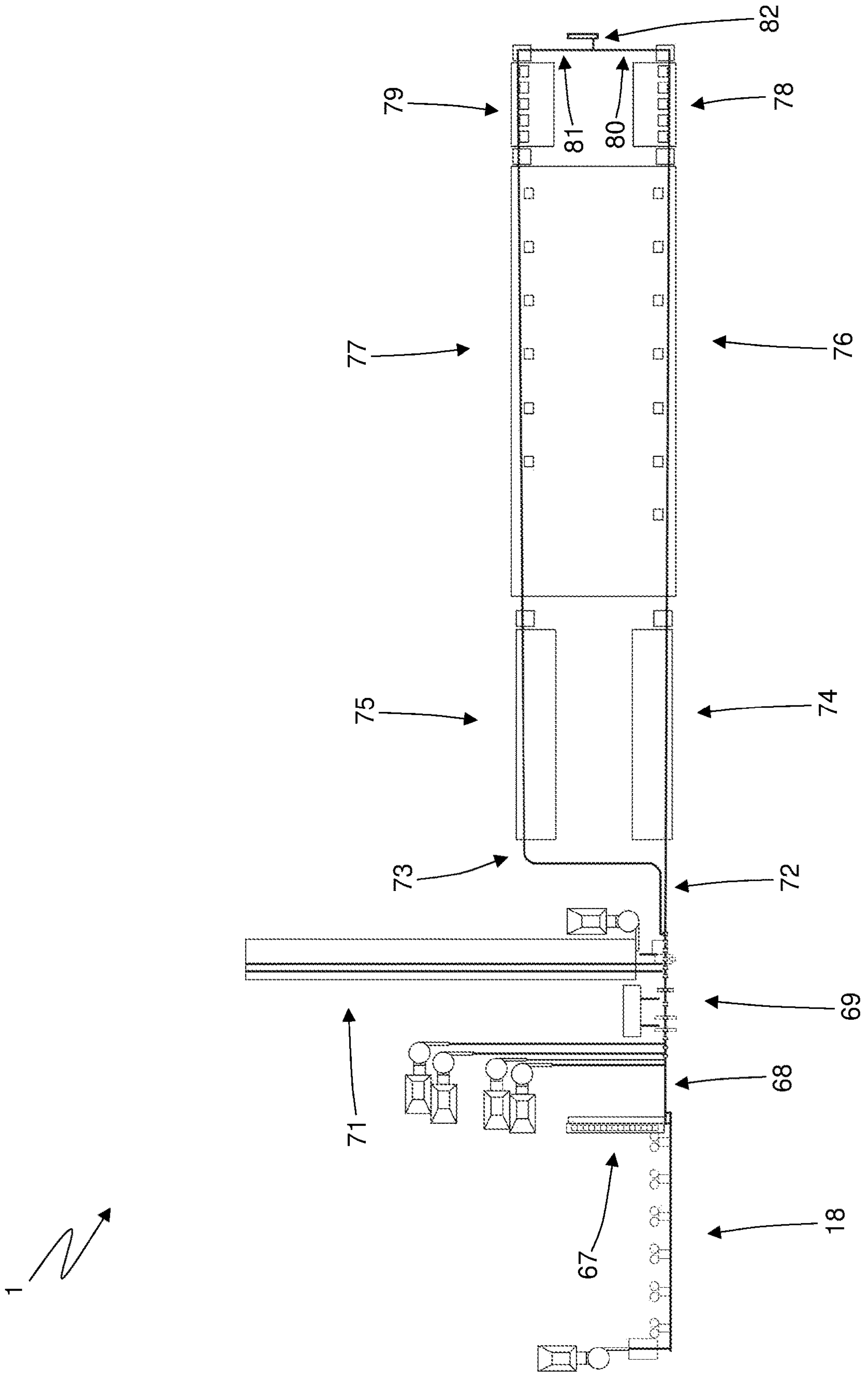
FIG. 2 is a schematic and plan view of a production plant for the production of the disposable cartridge of FIG. 1.

FIG. 2 schematically illustrates a production plant designed for manufacturing the disposable cartridge 100.

Figure 3:
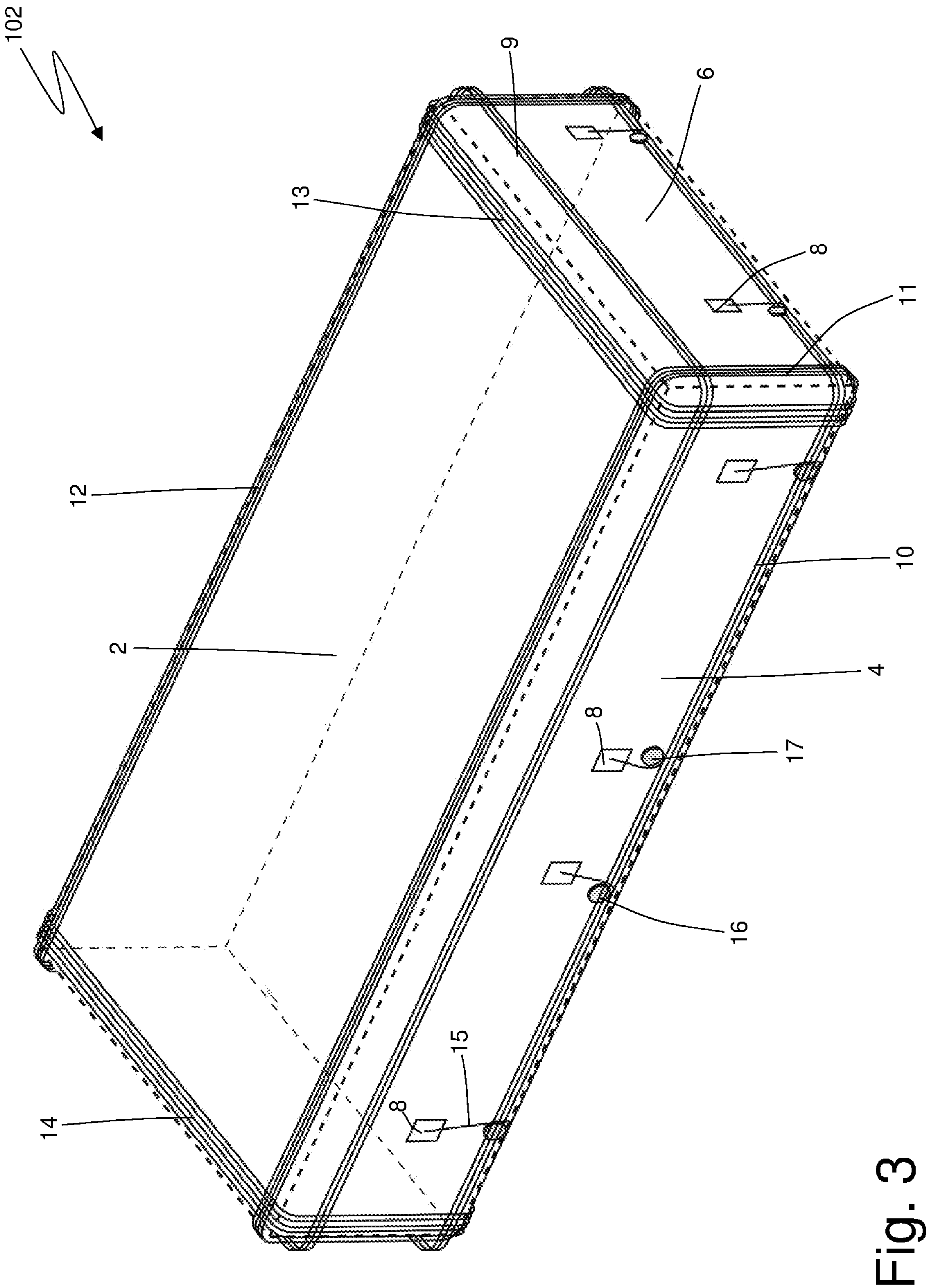
FIGS. 3 and 4 are two different perspective views of a component of the disposable cartridge of FIG. 1.
Figure 4:
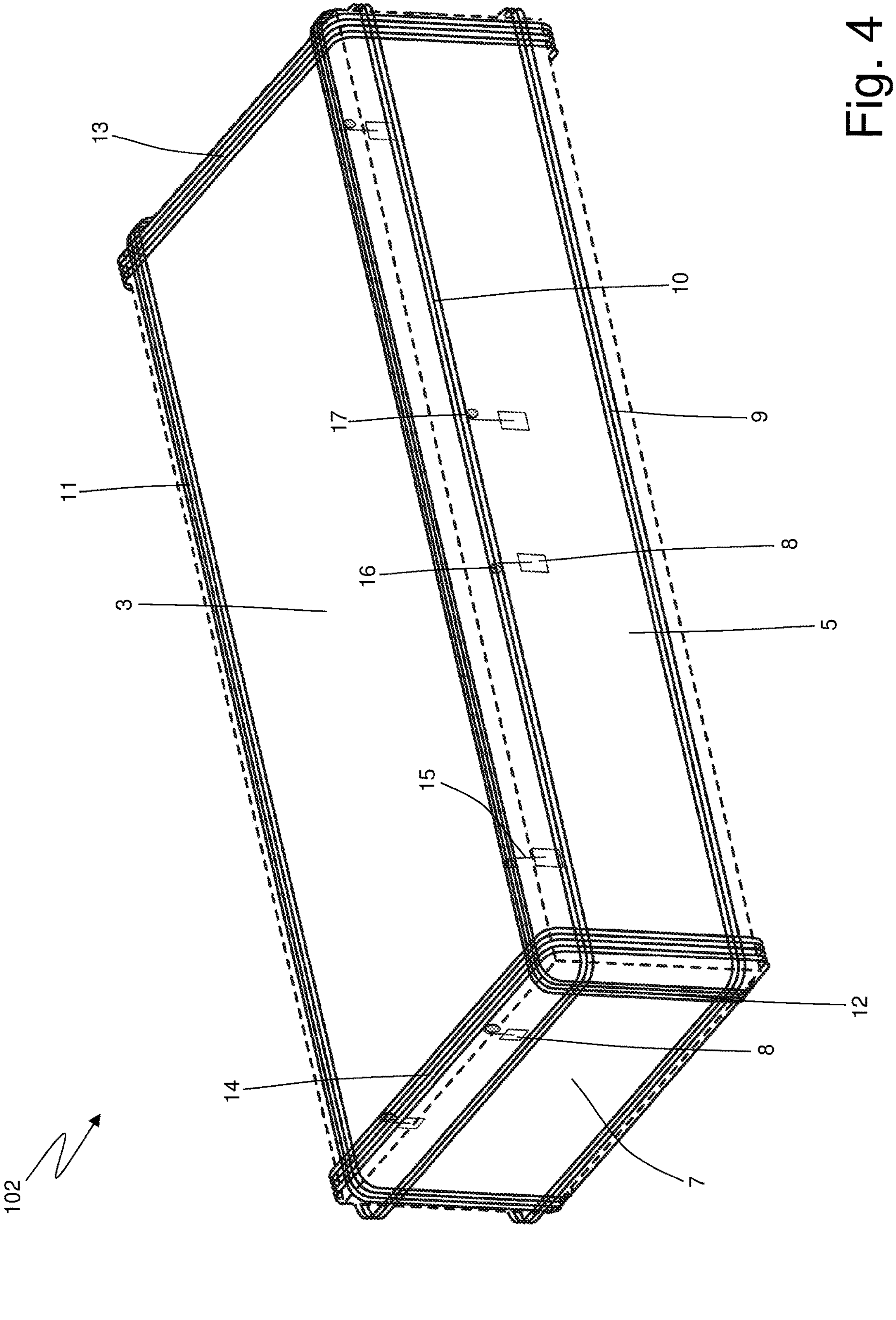

As illustrated in FIGS. 3 and 4, the component 102 of the disposable cartridge 100 has a roughly parallelepiped shape with six walls (faces): an upper wall 2, a lower wall 3 parallel and opposite the upper wall 2, a front wall 4, a rear wall 5 parallel and opposite the front wall 4 and two side walls 6 and 7 parallel and opposite one another.

The component 102 comprises an integrated electronic circuit (not illustrated) that is arranged inside the component, is generally provided with its own electric battery (namely, with its own source of electrical energy) and has six pairs of electrical contacts 8, which are arranged at the walls 4-7: a pair of electrical contacts 8 is arranged at the side wall 6, two pairs of electrical contacts 8 are arranged at the front wall 4, a pair of electrical contacts 8 is arranged at the side wall 7, and two pairs of electrical contacts 8 are arranged at the rear wall 5.

Furthermore, component 102 comprises six coils 9-14 which are wound: two coils 9 and 10 of larger size (area) which surround the walls 4-7 and are arranged at opposite ends of component 102 (namely, the coil 9 is arranged near the upper wall 2 while the coil 10 is arranged near the lower wall 3), two coils 11 and 12 of medium size (area) that surround the walls 2-3 and 6-7 and are arranged at the opposite ends of the component 102 (namely, the coil 11 is arranged near the front wall 4 while the coil 12 is arranged near the rear wall 5), and two coils 13 and 14 of smaller size (area) that surround the walls 2-5 and are arranged at the opposite ends of the component 102 (namely, the coil 13 is arranged near the side wall 6 while the coil 14 is arranged near the side wall 7).

Each coil 9-14 is wound and is made up of a plurality of turns of an externally insulated conductive wire 15 that form a winding; in the embodiment illustrated in the attached figures about 3-5 turns are provided for each coil 9-14 (but a greater number of turns could also be provided, such as for example 10-50 turns and preferably 10-30 turns). According to a preferred embodiment, the conductor wire 15 has a diameter ranging from 10 to 500 microns and preferably from 20 to 200 microns (even if in most applications the diameter ranges from 25 to 150 microns). Each coil 9-14 (namely, the wound wire 15 that makes up each coil 9-14) has two ends (obviously an initial end and a final end depending on the winding direction) which are welded to a corresponding pair of electrical contacts 8.

The electronic circuit of the component 102 uses, alternatively or simultaneously, the six coils 9-14 (or a part of the six coils 9-14) to communicate in radiofrequency with other electronic devices arranged in the vicinity. Alternatively or in addition, the electronic circuit of component 102 could also use the six coils 9-14 (or a part of the six coils 9-14) to generate electrical energy (designed for the operation thereof and/or to recharge the electric battery) exploiting an electromagnetic field generated by an electronic device arranged nearby; namely, the electronic circuit of the component 102 could also use the six coils 9-14 (or a part of the six coils 9-14) to obtain an inductive (therefore contactless) electric recharge of its own electric battery. Consequently, the six coils 9-14 of the component 102 make up corresponding antennas that can be used to exchange (transmit) information by means of electromagnetic waves (in this case the antennas are part of a telecommunication device) and/or can be used to exchange electricity by means of electromagnetic waves (in this case the antennas are part of a charging device). Namely, each of the coils 9-14 of the component 102 makes up a helical antenna for electromagnetic interactions which can be intended for the exchange (transmission) of information or can be intended for generating electrical energy by means of electromagnetic induction.

The component 102 finally comprises six pairs of pins 16 and 17 (namely, two small columns) which project in a cantilevered manner (namely, perpendicularly) from the corresponding walls 2-7 and are arranged near corresponding pairs of electrical contacts 8; the two ends (initial and final) of the wound wire 15 that makes up each coil 9-14 are bent at (approximately) 90° around the corresponding pins 16 or 17 before joining the corresponding electrical contacts 8 (namely, before reaching the corresponding electrical contacts 8 on which the two ends are welded).

It is important to note that the positioning and shape of the electrical contacts 8 and the pins 16 and 17 could be completely different, thus being understood that two respective electrical contacts 8 and two respective pins 16 and 17 are associated with each coil 9-14 and that the pins 16 and 17 are arranged in (relative) proximity to the electrical contacts 8.

In the embodiment illustrated in the attached figures, the component 102 comprises six coils 9-14; according to other embodiments not illustrated, the component 102 has a different number of coils 9-14 that is generally comprised between two and five (but in some cases more than six coils 9-14 or even one single coil 9-14 could also be provided). In other words, the component 102 has at least one coil 9-14 and can have a plurality of coils 9-14.

Figure 5:
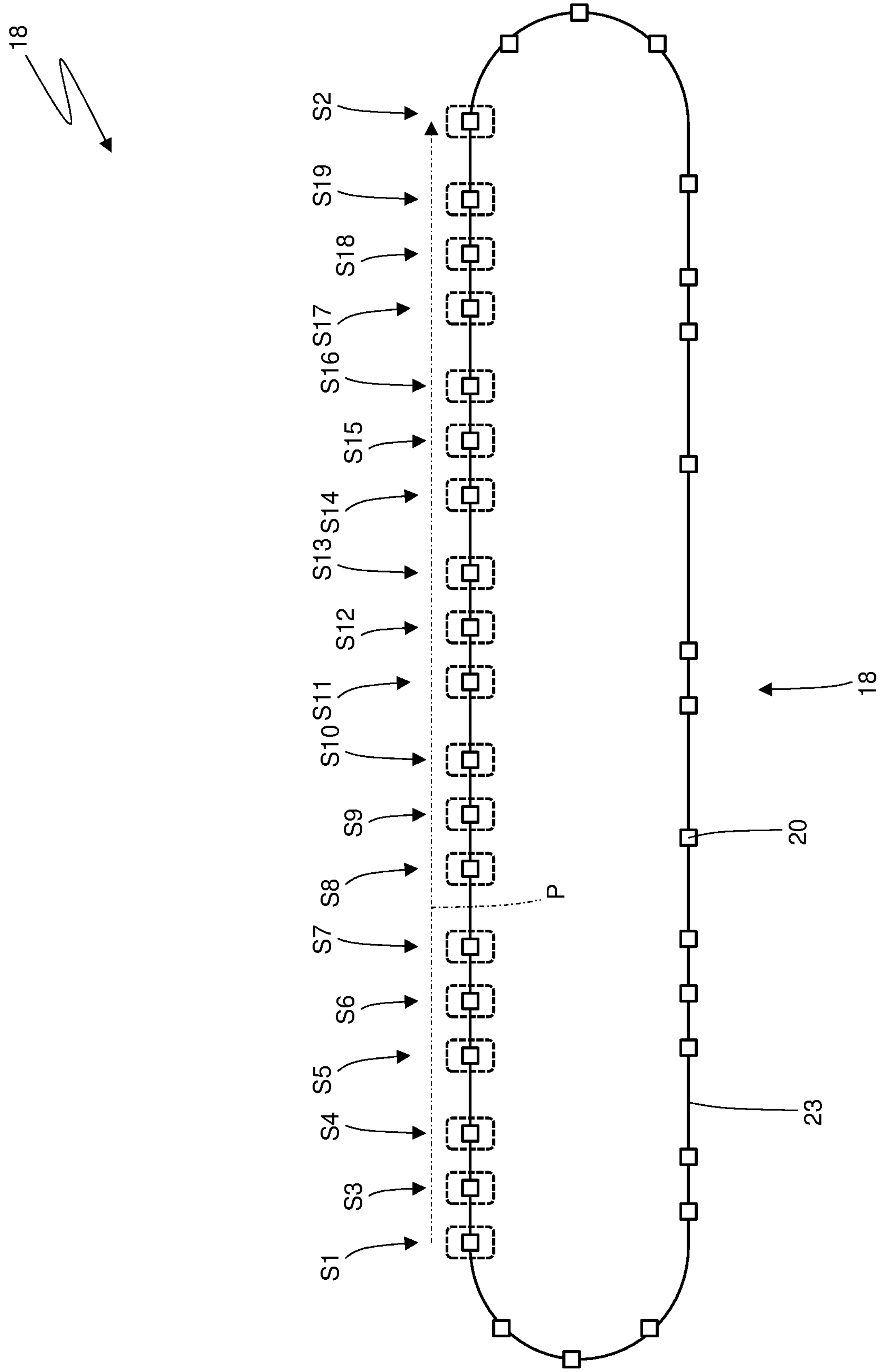
FIG. 5 is a schematic view of a winding machine of the production plant of FIG. 2 that produces the component of FIGS. 3 and 4.
Figure 6:
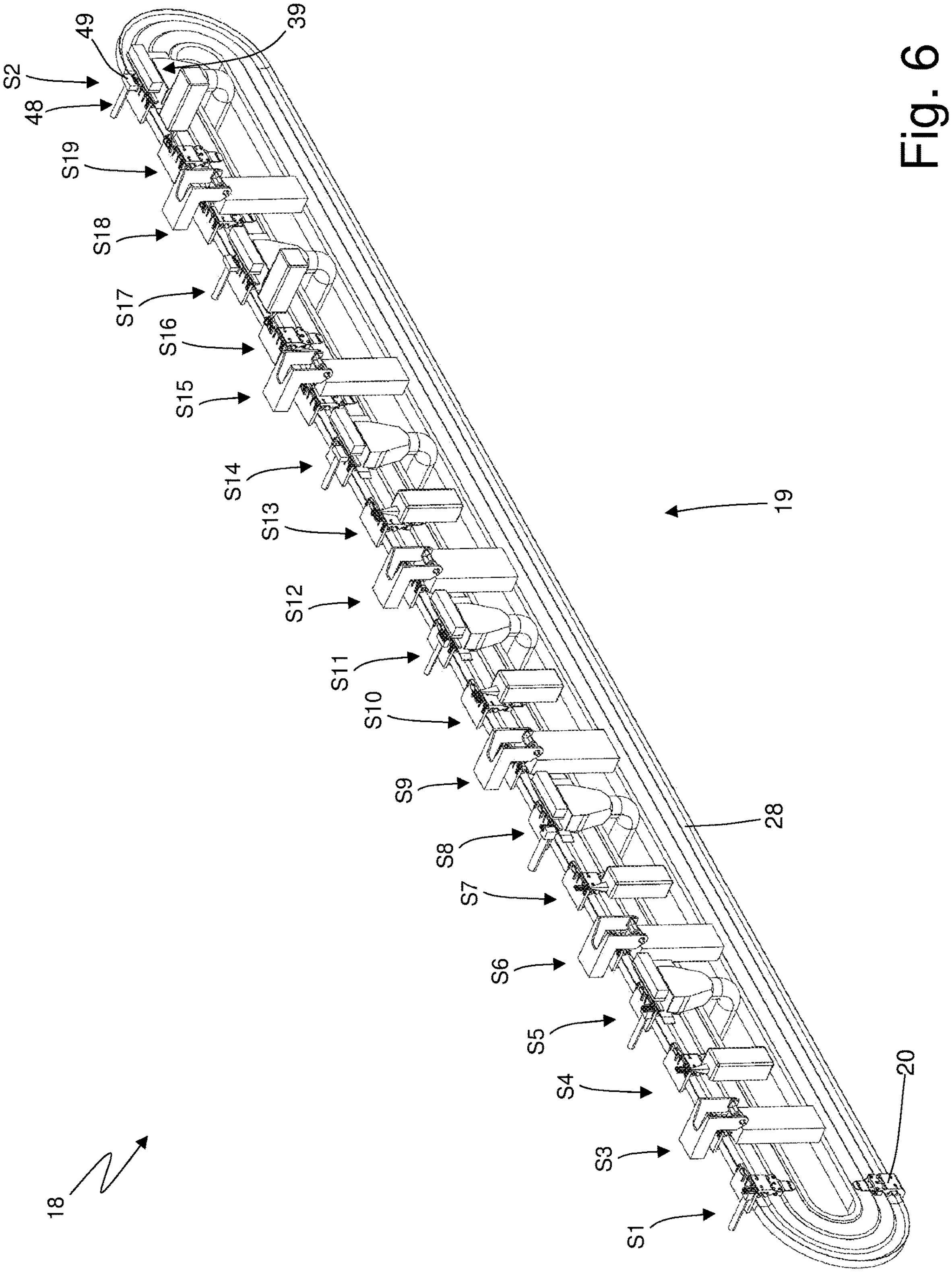
FIG. 6 is a perspective view and with the removal of parts for clarity of the machine of FIG. 5.

In FIGS. 5 and 6, the reference number 18 denotes as a whole a machine for manufacturing the coils 9-14 in the component 1.

The winding machine 18 comprises a support body (namely, a frame) which rests on the ground by means of legs and has a vertical wall, on the front, on which the operating members are mounted. Furthermore, the winding machine 18 comprises a main conveyor 19 that moves the components 1 being processed along a working path P1, which develops between an input station 51 (in which the main conveyor 19 receives the components 1 where the coils 9-14 are formed) and an output station S2 (in which the main conveyor 19 transfers the completed components 1, namely, provided with the coils 9-14).

The working path P1 passes through a series of stations S3-S19 (better described in the following), in which the operations for manufacturing the six coils 9-14 are carried out. In the embodiment illustrated in the attached figures, the main path P comprises one single horizontal and linear section (namely, which extends substantially along a straight line arranged horizontally) arranged between the input station S1 and the output station S2; according to a different embodiment not illustrated, the working path P1 comprises: an upper section that is horizontal and linear, a lower section that is horizontal and linear (therefore it is parallel to the upper section), and a semi-circular connecting section which connects the upper section and the lower section to one another.

Figure 7:
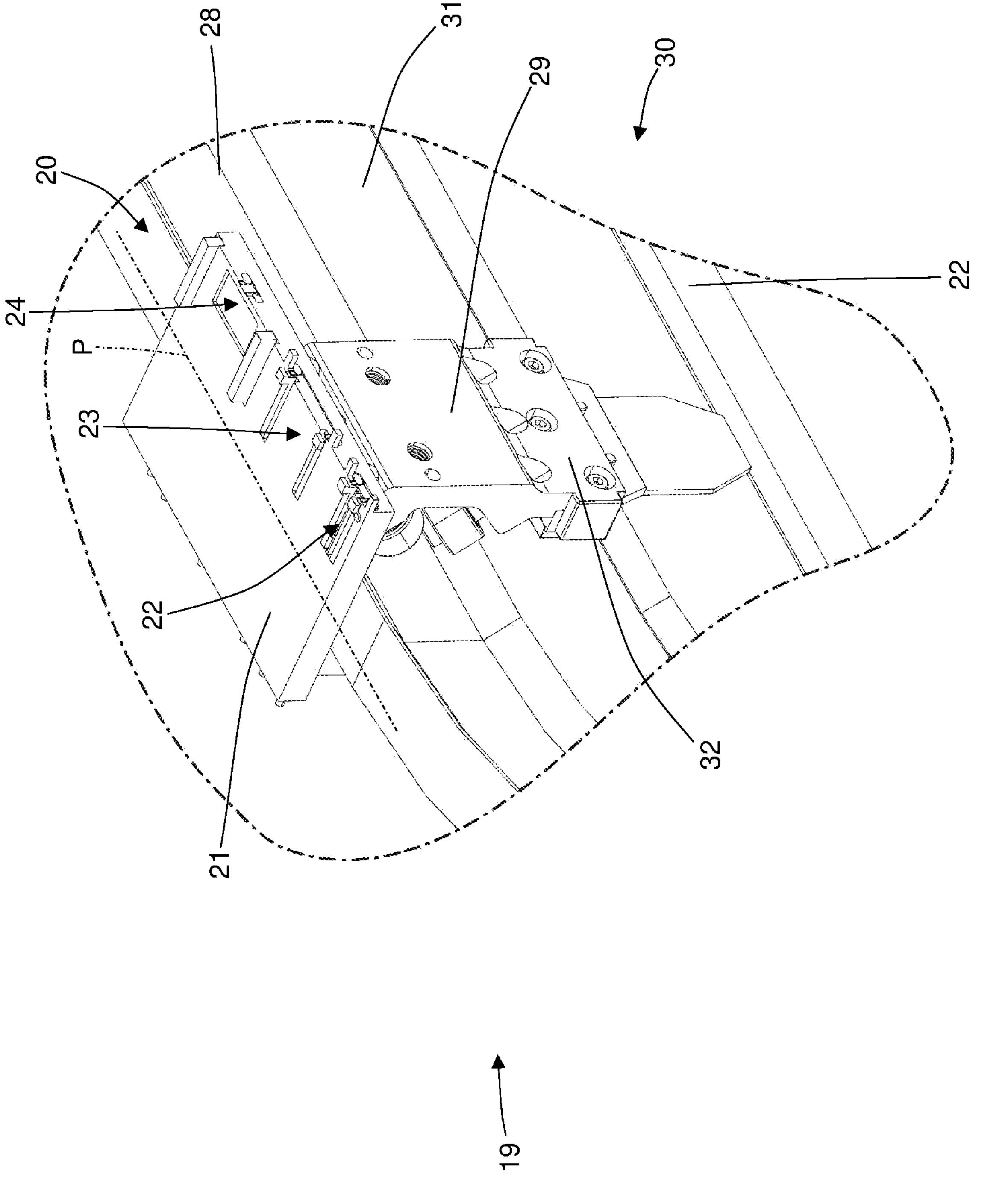
FIG. 7 is a perspective view of a carriage of a main conveyor of the machine of FIG. 3.
Figure 8:
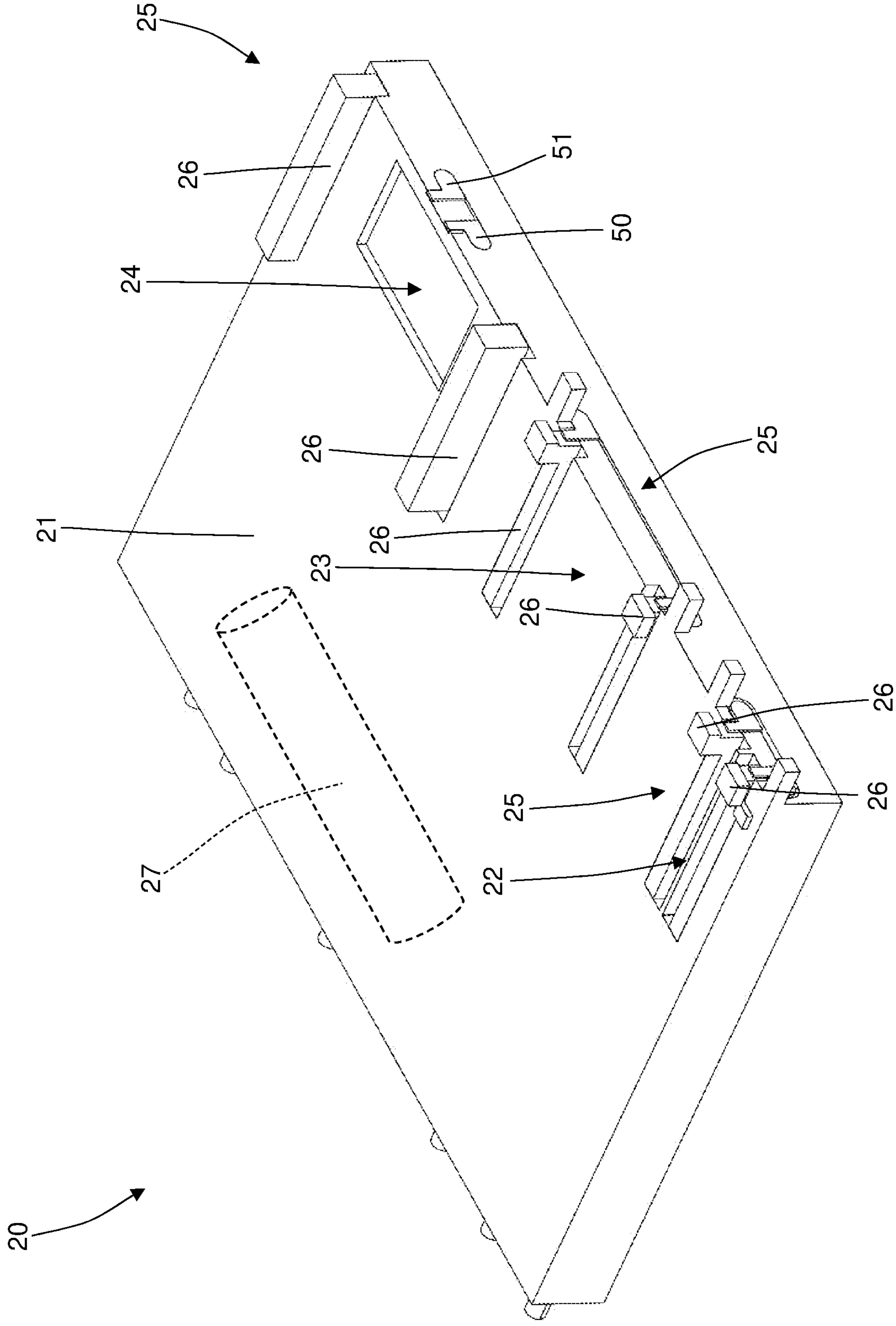
FIGS. 8 and 9 are different perspective views and with the removal of parts for clarity of a support plate of the carriage of FIG. 7.
Figure 9:
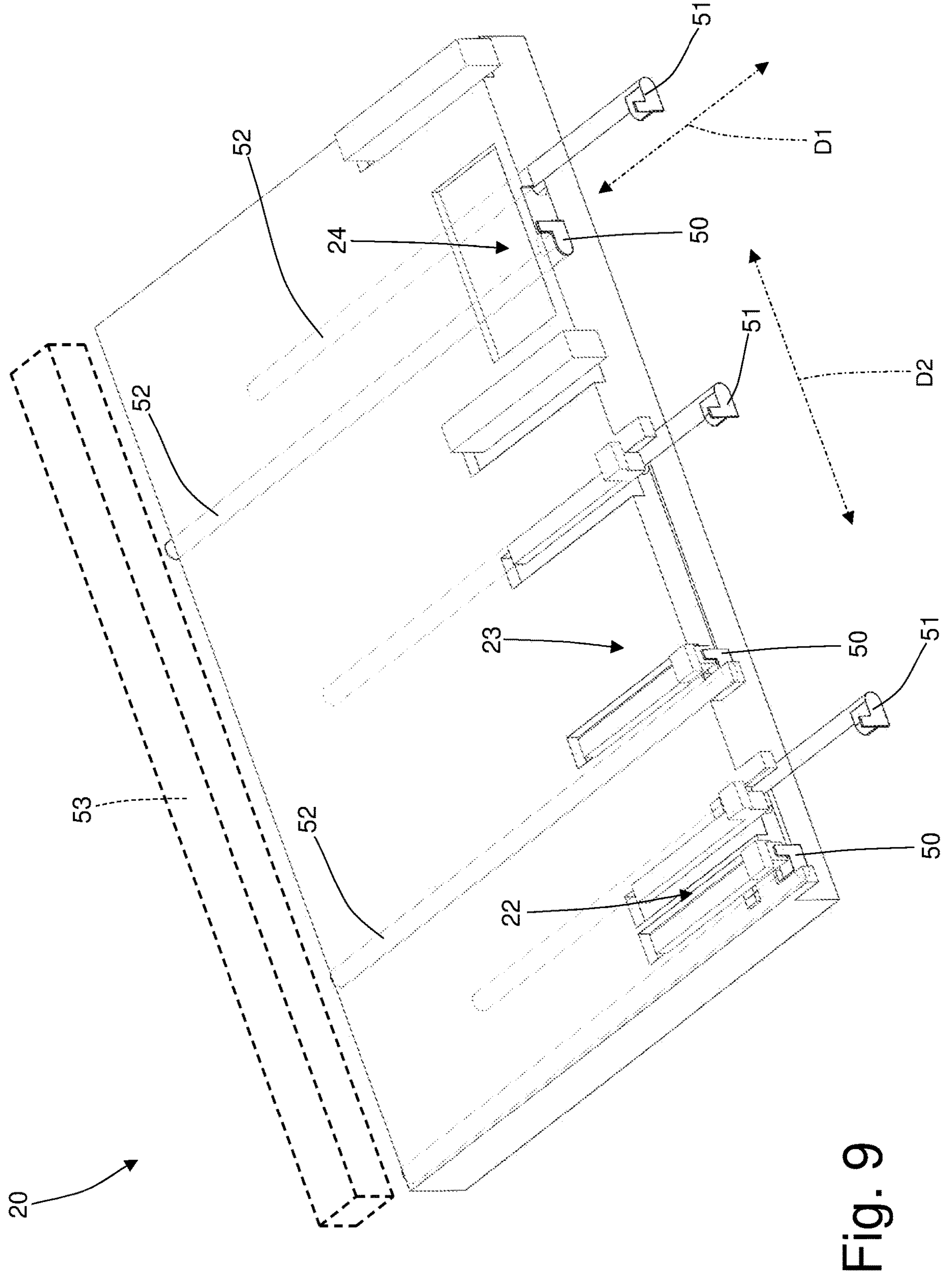

The main conveyor 19 comprises a plurality of carriages 20 which are moved along the working path P1; as better illustrated in FIGS. 7, 8 and 9, each carriage 20 comprises a support plate 21 in which three different seats 22, 23 and 24 are obtained, each designed to receive and house the same component 102 with different orientations. Namely, the seat 22 is designed to house the component 102 when the side wall 6 or the side wall 7 of the component 102 rests on the support plate 21, the seat 23 is designed to house the component 102 when the front wall 4 or the rear wall 5 of the component 102 rests on the support plate 21, and the seat 24 is designed to house the component 102 when the upper wall 2 or the lower wall 3 of the component 102 rests on the support plate 21. Therefore, each support plate 21 is designed to support one single component 102 which can be arranged in three different orientations and in six different positions (each orientation has two different positions).

According to a preferred embodiment better illustrated in FIG. 8, each seat 22, 23 or 24 comprises a clamp 25 which is closed to firmly grip a component 102 resting on the support plate 21 and is opened to release a component 102 resting on the support plate 21. Each clamp 25 comprises two opposing jaws 26 which are arranged at the opposite ends of the seat 22, 23 or 24, are movable by means of a linear movement (which develops parallel to the working path P1), and in use they move between a holding position in which the two jaws 26 are closer to one another and hold together a component 102 resting on the support plate 21 and a release position in which the two jaws 26 are further apart and release a component 102 resting on the support plate 21. The clamps 25 are all controlled together by the same actuator device 27 (namely, all three clamps 25 open and close at the same time), which can be mounted on the support plate 21 or can be external to the support plate 21 and arranged in a fixed position next to the main conveyor 19. Preferably, each clamp 25 is normally closed, namely, in the absence of the intervention of the actuator device 27 it naturally remains closed; this result is obtained due to the presence of a spring which tends to push the jaws 26 of each clamp 25 towards the closed position and is compressed by the action of the actuator device 27 (namely, the actuator device 27 must overcome the elastic force generated by the spring to move the jaws 26 of each clamp 25 towards the open position). According to a different embodiment, each clamp 25 has its own actuator device 27 which is separate and independent from the actuator devices 27 of the other two clamps 25; in this way each actuator device 27 is optimized for the stroke of the jaws 26 of the corresponding clamp 25.

It is important to note that the three clamps 25 of the three seats 22, 23 and 24 of the same support plate 21 are functionally the same (namely, they are all designed to grip and hold the component 102 in three different positions) but could be structurally different (namely, have different shapes) in order to adapt to the conformation of the component 1.

Obviously, the number of seats 22 obtained in the support plate 21 of each carriage 20 could be different from three, depending on the number of coils 9-14 to be made and on the conformation of the component 1; therefore, the support plate 21 of each carriage 20 could have only one seat 22, 23 or 24 or two seats 22, 23 or 24 or even more than three seats 22, 23 or 24.

The main conveyor 19 is designed to cyclically move each carriage 20 along the working path P1 with an intermittent movement (at step) which provides for cyclical alternation of movement steps, in which the main conveyor 19 moves the carriages 20 and stop steps, in which the main conveyor 19 keeps the carriages 20 stopped. As illustrated in FIG. 7, the main conveyor 19 is of the linear motor type and comprises an annular guide 28 (namely, closed in loop on itself), which is arranged in a fixed position along the working path P1; in particular, the annular guide 28 consists of one single fixed track (namely, devoid of movement), which is arranged along the working path P1. Furthermore, the main conveyor 19 comprises a plurality of slides 29, each supporting a corresponding carriage 20 and coupled to the guide 28 so as to freely slide along the guide 28. Finally, the main conveyor 19 comprises a linear electric motor 30, which moves the slides 29 carrying the carriages 20 along the working path P1; the linear electric motor 20 comprises an annular stator 31 (namely, a fixed primary) which is arranged in a fixed position along the guide 28 and a plurality of movable sliders 32 (namely, movable secondaries), each electromagnetically coupled to the stator 31 so as to receive, from the stator 31, a driving force and is rigidly connected to a corresponding slide 29.

According to a different embodiment not illustrated, the main conveyor 19 is a belt conveyor and comprises (at least) a flexible belt which supports the carriages 20 and is closed in a loop around two end pulleys (at least one of which is motorized). According to a further embodiment not illustrated, the main conveyor 19 is a wheel (arranged vertically or horizontally) which is mounted so as to rotate about a central rotation axis; obviously in this embodiment the working path P1 has a circular shape.

In the following description, the functions of the stations S1-S19 of the winding machine 18 are explained with reference to one single carriage 20 which moves one single component 1.

Figure 10:
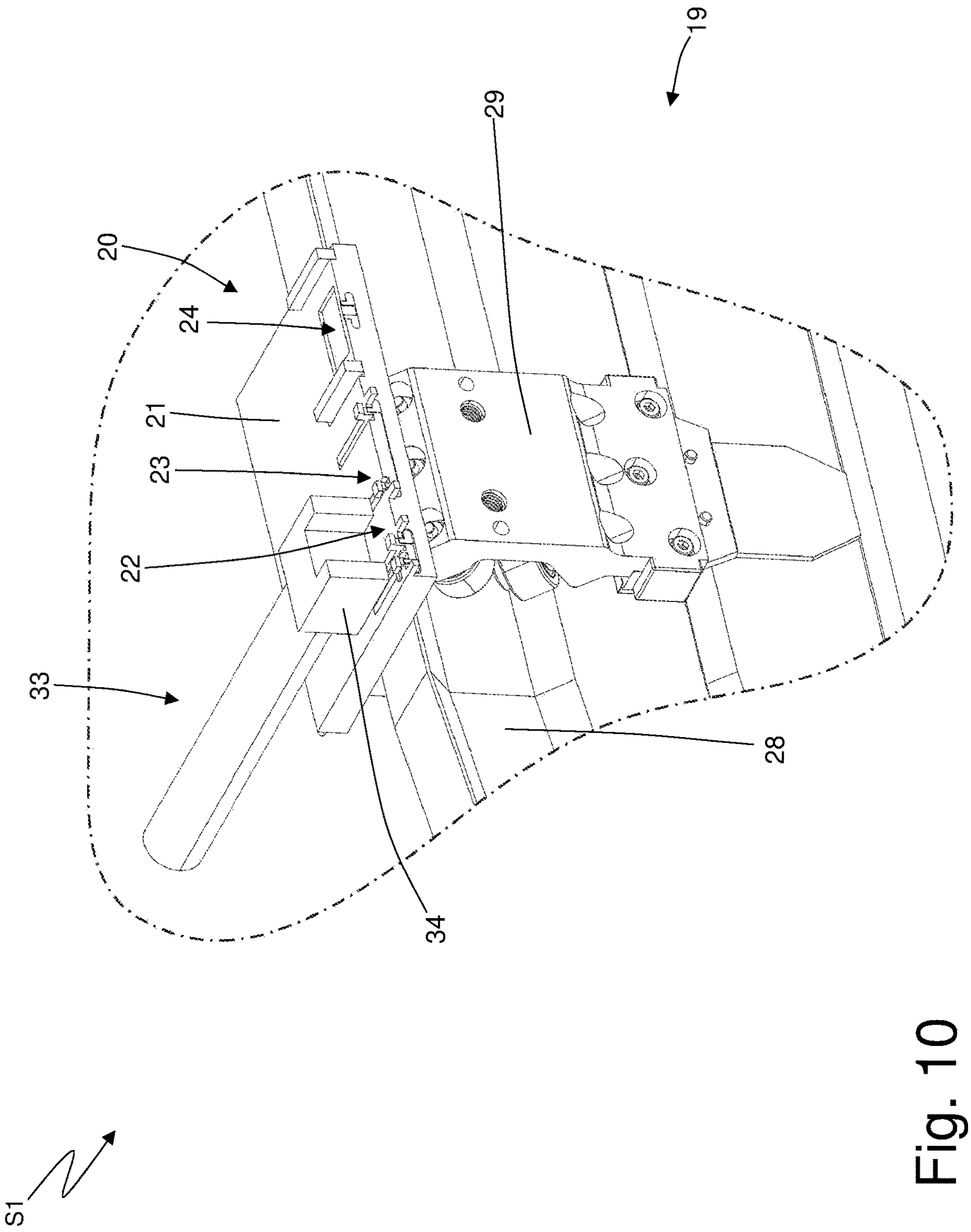
FIG. 10 is a perspective view and with the removal of parts for clarity of an input station of the machine of FIG. 5.
Figure 11:
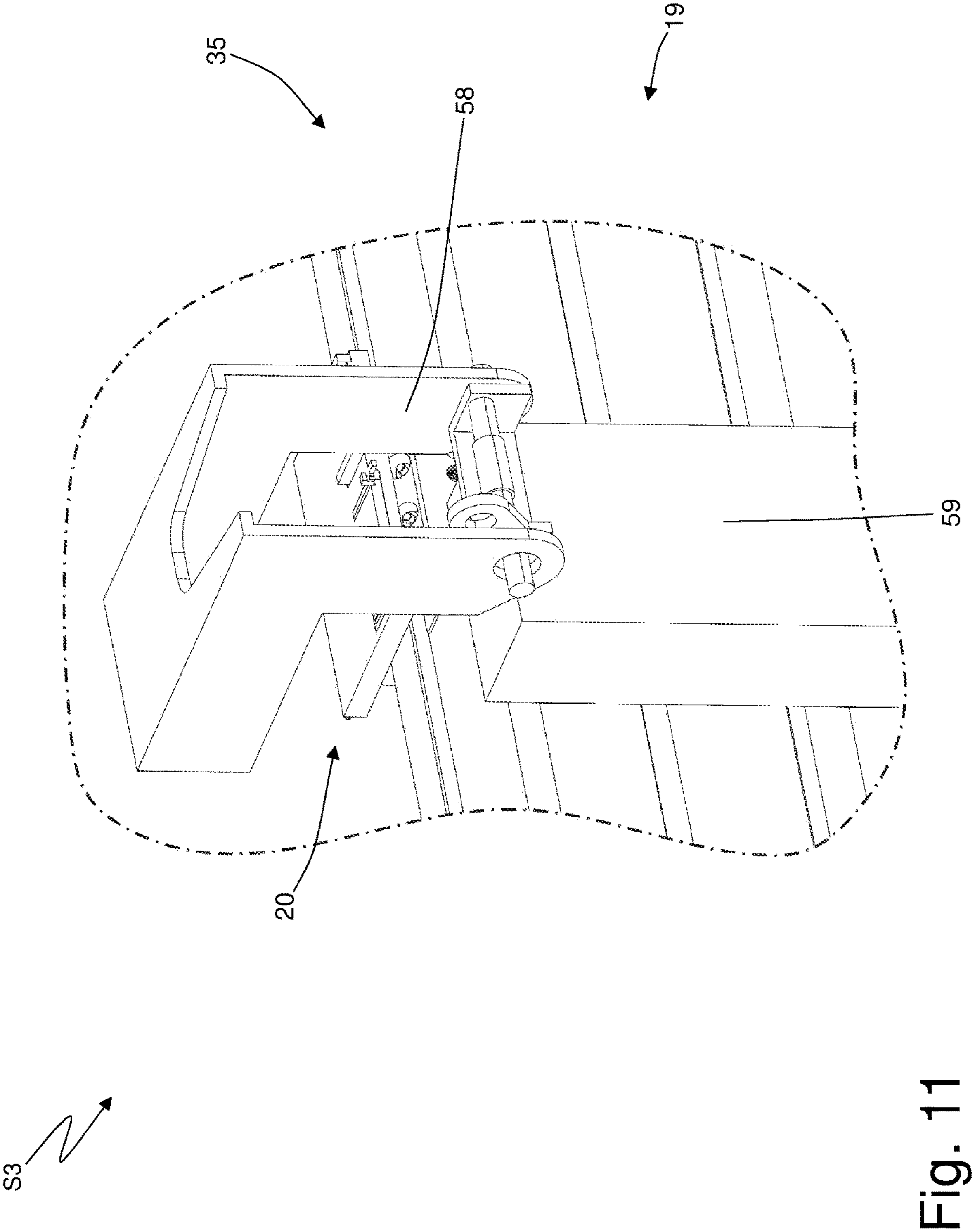
FIGS. 11-14 are respective perspective views and with the removal of parts for clarity of a winding station of the machine of FIG. 5.
Figure 12:
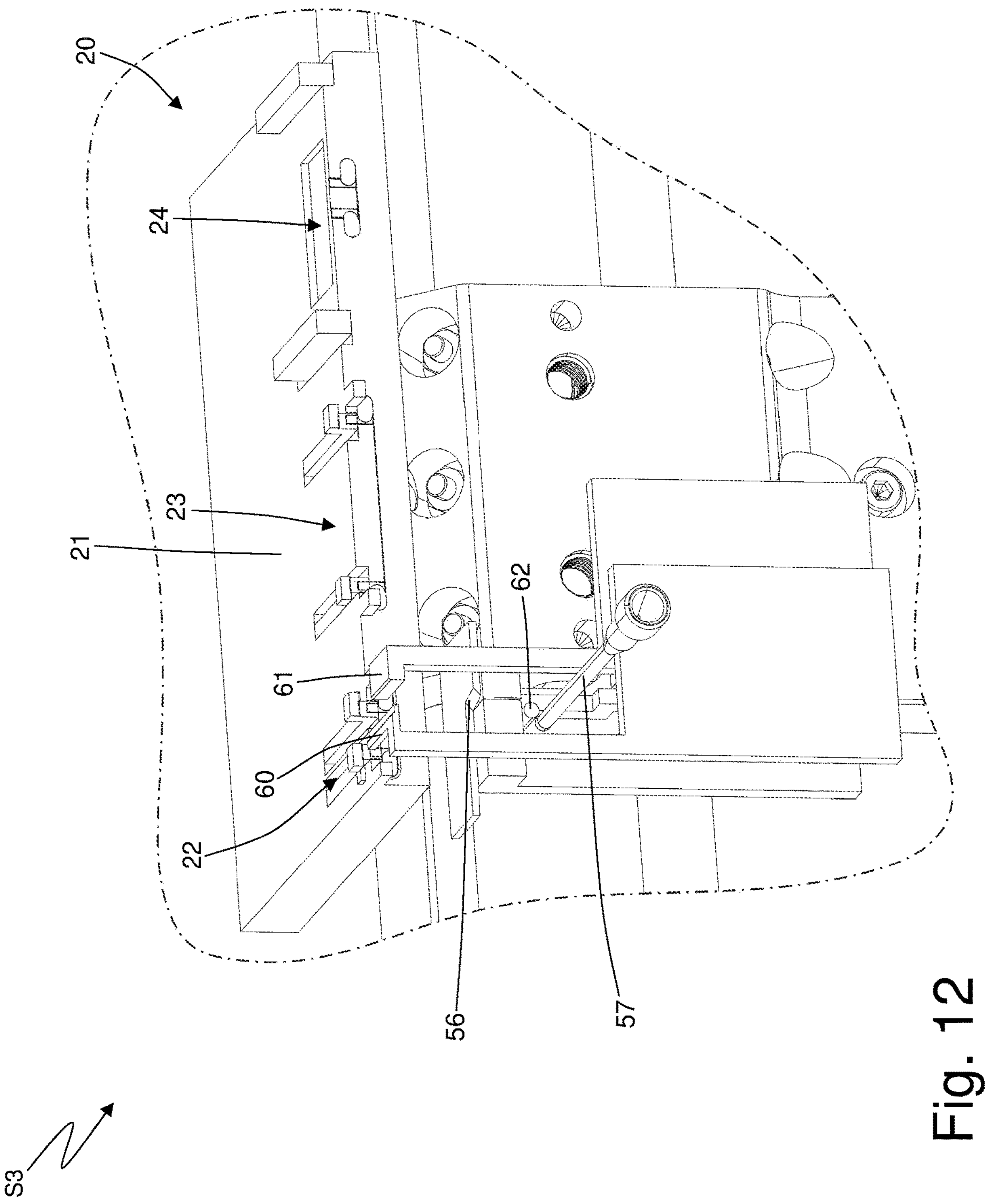
Figure 13:
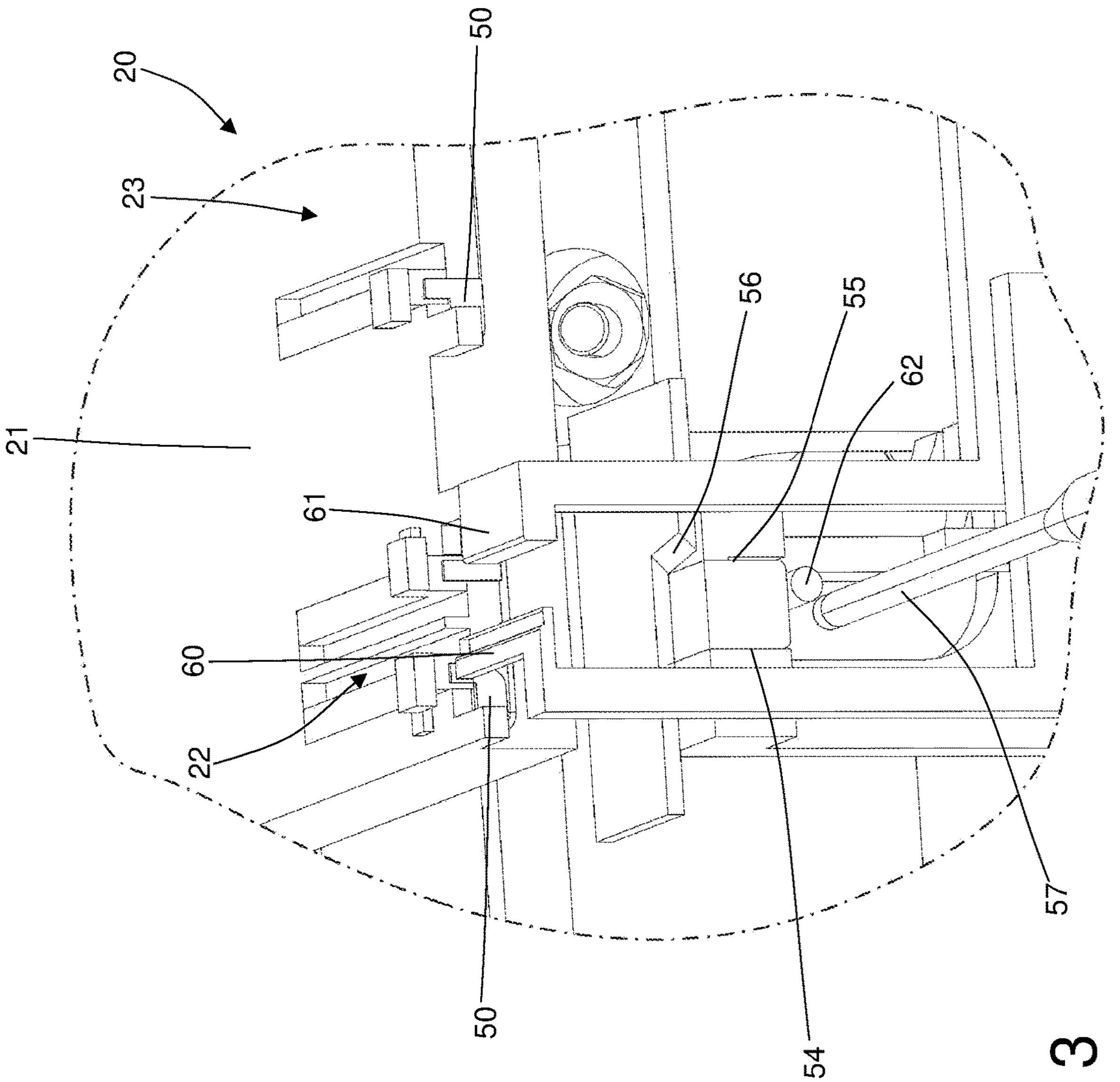
Figure 14:
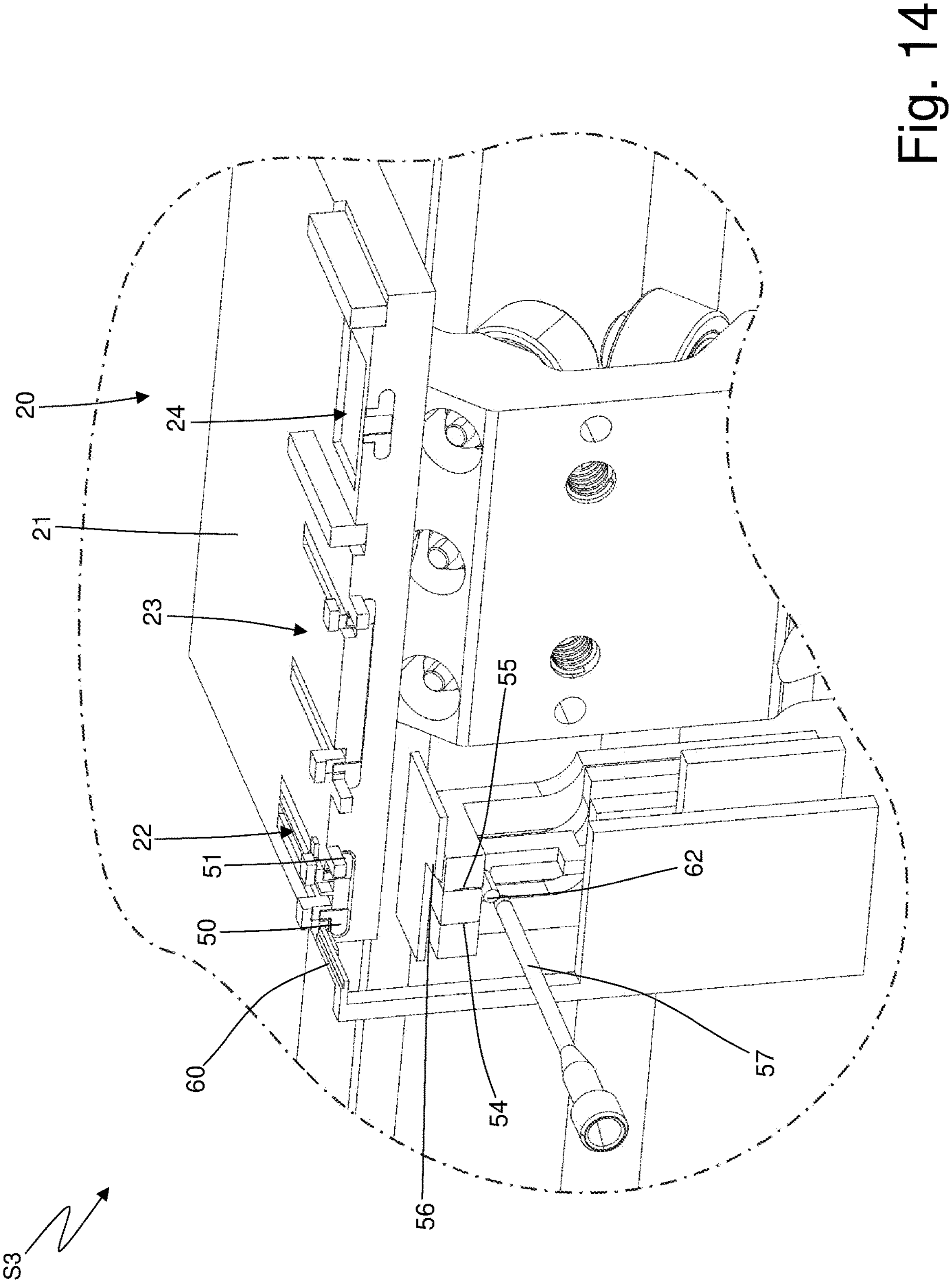

As illustrated in FIGS. 5 and 6, at the starting of the production cycle of the coils 9-14 the main conveyor 19 moves the carriage 20 (carrying three seats 22 to be used alternatively) along the working path P1 to stop one single carriage 20 in the input station S1 in which one single component 102 is arranged in the seat 22 of the carriage 20 by resting the side wall 6 on the support plate 21 (namely, with the side wall 7 arranged horizontally and at the highest point). As illustrated in FIG. 10, in the input station S1 a motorized arm 33 is provided, having a holding head 34, which is designed to grip the component 102 by tightening the same on part of the walls 4 and 5 (namely, leaving the side walls 6 and 7 completely free); when the carriage 20 is stopped in the input station S1, the motorized arm 33 inserts a component 102 in the seat 22 of the carriage 20 by resting the side wall 6 on the support plate 21.

Subsequently, the main conveyor 19 moves the carriage 20 (carrying only one component 102 within the seat 22) along the working path P1 and from the input station S1 to the winding station S3, in which the carriage 20 stops and where a winding unit 35 (illustrated in greater detail in FIGS. 11-14) winds, around the component 102 carried by the carriage 20, an externally insulated conductive wire 15 so as to form a series of turns making up the coil 14.

Subsequently, the main conveyor 19 moves the carriage 20 (carrying one single component 102 within the seat 22) along the working path P1 and from the winding station S3 to the welding station S4 (arranged downstream of the winding station S3), in which the carriage 20 stops and where the two opposite ends of the coil 14 that have been wound in the previous winding station S3, are welded (for example by way of ultrasound, by way of heat sealing or by way of laser) to the two corresponding electrical contacts 8 by a welding unit 36 (illustrated in greater detail in FIG. 15).

Figure 16:
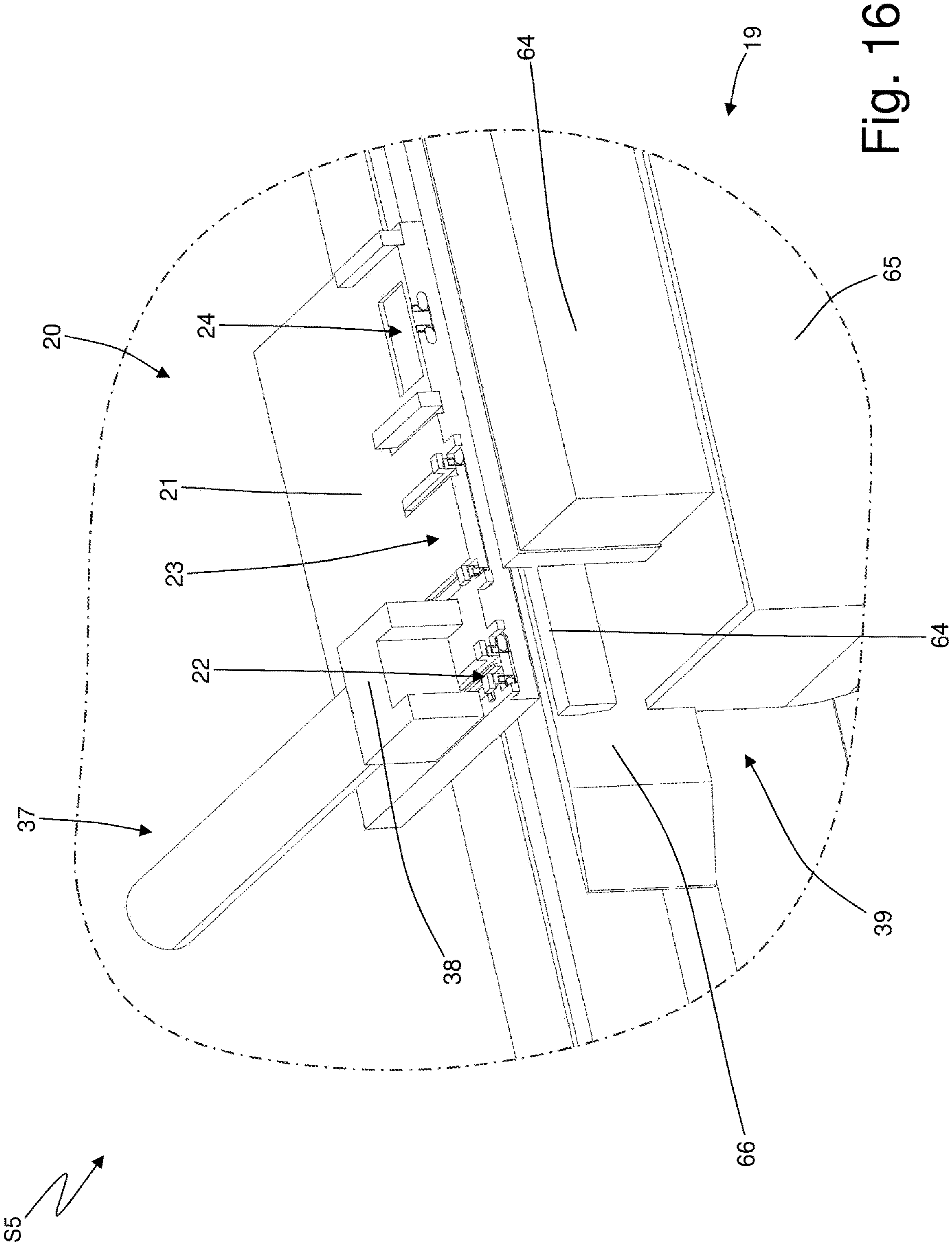
FIGS. 16-20 are respective perspective views and with the removal of parts for clarity of as many handling stations of the machine of FIG. 5.

Subsequently, the main conveyor 19 moves the carriage 20 (carrying one single component 102 within the seat 22) along the working path P1 and from the welding station S4 to the handling station S5 (arranged downstream of the welding station S4), in which the carriage 20 stops and where the component 102 is overturned (namely, rotated on itself by) 180° in order to finally be arranged in the seat 22 of the carriage 20 by resting the side wall 7 on the support plate 21 (namely, with the side wall 6 arranged horizontally and at the highest point). As illustrated in FIG. 16, in the handling station S5 a motorized arm 37 is provided, having a holding head 38 which is designed to grip the component 102 by tightening the same on part of the walls 4 and 5 (namely, leaving the side walls 6 and 7 completely free); when the carriage 20 is stopped in the handling station S5, the motorized arm 37 grips the component 102 arranged in the seat 22 of the carriage 20 and rotates the same on itself by 180° so as to rest the side wall 7 on the support plate 21 (previously the side wall 6, which is opposite the side wall 7, was resting on the support plate 21).

According to a preferred embodiment, in the handling station S5 a removal unit 39 is also provided which, while the motorized arm 37 modifies the position of the component 102 on the support plate 21, removes (eliminates) the excess parts of the two opposite ends of the coil 14 (cut in the previous welding station S4).

Subsequently, the main conveyor 19 moves the carriage 20 (carrying only one component 102 within the seat 22) along the working path P1 and from the handling station S5 to the winding station S6, in which the carriage 20 stops and where a winding unit 35 (completely identical to the winding unit 35 provided in the winding station S3) winds, around the component 102 carried by the carriage 20, an externally insulated conductive wire 15 so as to form a series of turns making up the coil 13.

Subsequently, the main conveyor 19 moves the carriage 20 (carrying one single component 102 within the seat 22) along the working path P1 and from the winding station S6 to the welding station S7 (arranged downstream of the winding station S6), in which the carriage 20 stops and where the two opposite ends of the coil 13 that has been wound in the previous winding station S6, are welded (for example by way of ultrasound, by way of heat sealing or by way of laser) to the two corresponding electrical contacts 8 by a welding unit 36 (completely identical to the welding unit 36 provided in the welding station S4).

Figure 17:
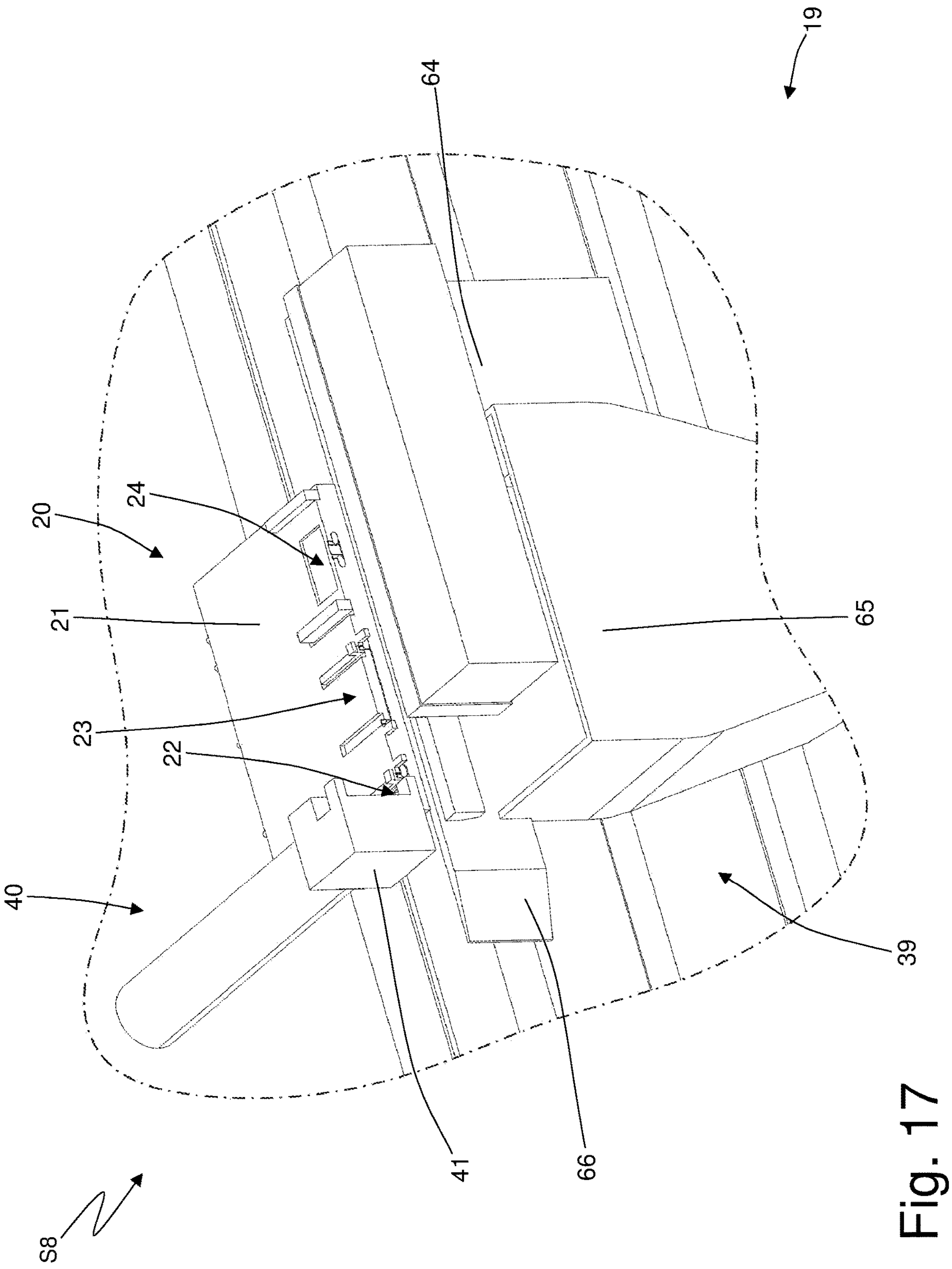

Subsequently, the main conveyor 19 moves the carriage 20 (carrying only one component 102 within the seat 22) along the working path P1 and from the welding station S7 to the handling station S8 (arranged downstream of the welding station S7), in which the carriage 20 stops and where the component 102 is rotated by 90° in order to be finally arranged in the seat 23 of the carriage 20 by resting the front wall 4 on the support plate 21 (namely, with the rear wall 5 arranged horizontally and at the highest point). As illustrated in FIG. 17, in the handling station S8 a motorized arm 40 is provided, having a holding head 41, which is designed to grip the component 102 leaving the front wall 4 completely free; when the carriage 20 is stopped in the handling station S8, the motorized arm 40 grips the component 102 which is arranged in the seat 22 of the carriage 20 and rotates the same on itself by 90° so as to rest the front wall 4 on the support plate 21 and by moving the component 102 from the seat 22 to the seat 23 (previously the component 102 was in the seat 22 and the side wall 7 was resting on the support plate 21).

According to a preferred embodiment, in the handling station S8 a removal unit 39 (completely identical to the removal unit 39 provided in the handling station S5) is also provided which, while the motorized arm 40 modifies the position of the component 102 on the support plate 21, removes (eliminates) the excess parts of the two opposite ends of the coil 13 (cut in the previous welding station S7).

Subsequently, the main conveyor 19 moves the carriage 20 (carrying only one component 102 within the seat 23) along the working path P1 and from the handling station S8 to the winding station S9, in which the carriage 20 stops and where a winding unit 35 (completely identical to the winding unit 35 provided in the winding station S3) winds, around the component 102 carried by the carriage 20, an externally insulated conductive wire 15 in order to obtain a series of turns making up the coil 12.

Subsequently, the main conveyor 19 moves the carriage 20 (carrying one single component 102 within the seat 23) along the working path P1 and from the winding station S9 to the welding station S10 (arranged downstream of the winding station S9), in which the carriage 20 stops and where the two opposite ends of the coil 12 that has been wound in the previous winding station S9, are welded (for example by way of ultrasound, by way of heat sealing or by way of laser) to the two corresponding electrical contacts 8 by a welding unit 36 (completely identical to the welding unit 36 provided in the welding station S4).

Figure 18:
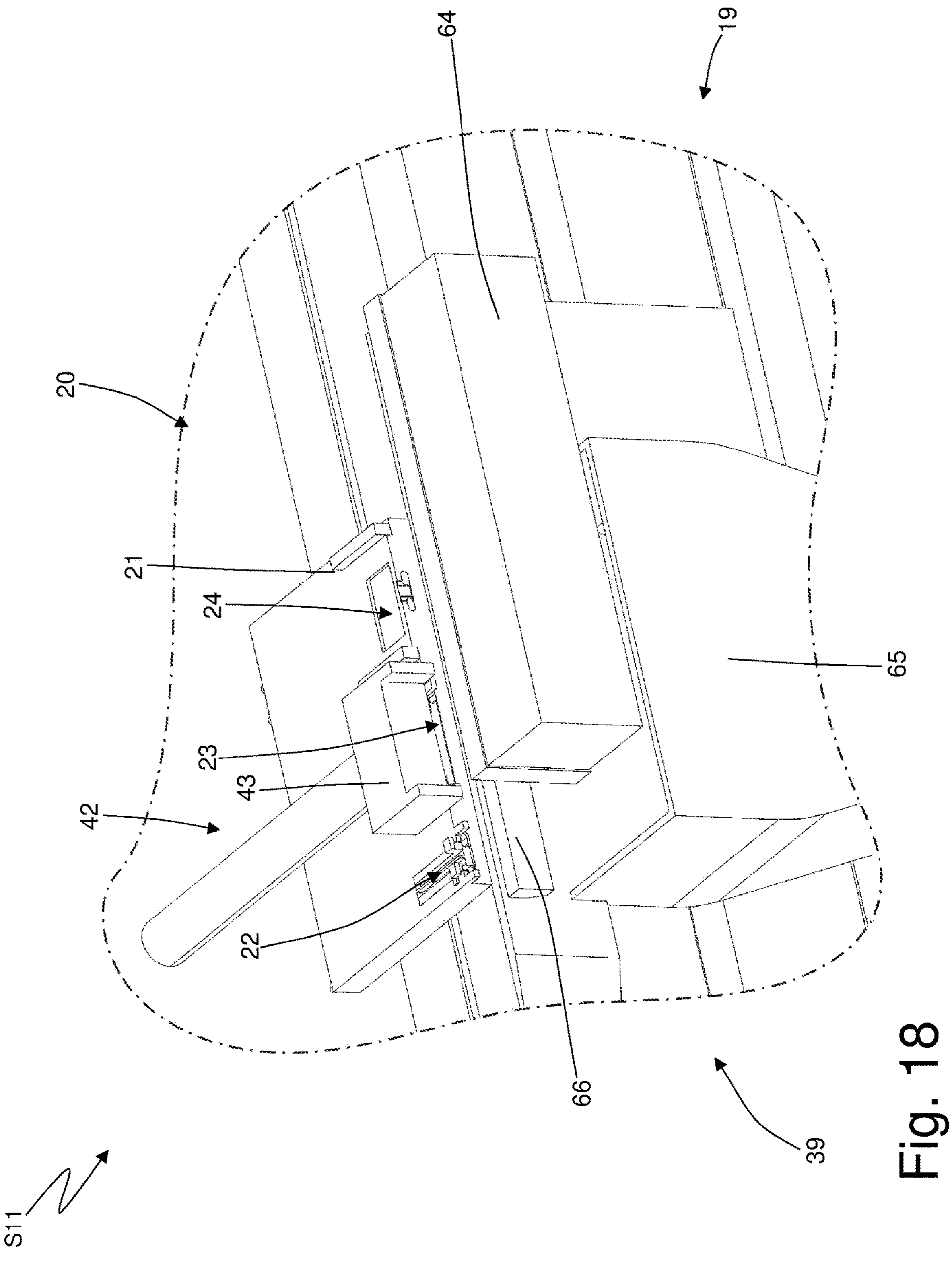

Subsequently, the main conveyor 19 moves the carriage 20 (carrying one single component 102 within the seat 23) along the working path P1 and from the welding station S10 to the handling station S11 (arranged downstream of the welding station S10), in which the carriage 20 stops and where the component 102 is overturned (namely, rotated on itself by 180°) in order to be finally arranged in the seat 23 of the carriage 20 by resting the rear wall 5 on the support plate 21 (namely, with the front wall 4 arranged horizontally and at the highest point). As illustrated in FIG. 18, in the handling station S11 a motorized arm 42 is provided, having a holding head 43 which is designed to grip the component 102 leaving the walls 4 and 5 completely free; when the carriage 20 is stopped in the handling station S11, the motorized arm 40 grips the component 102 which is arranged in the seat 23 of the carriage 20 and rotates the same on itself by 180° so as to rest the rear wall 5 on the support plate 21 (previously the front wall 4, which is opposite the rear wall 5, was resting on the support plate 21).

According to a preferred embodiment, in the handling station S11 a removal unit 39 (completely identical to the removal unit 39 provided in the handling station S5) is also provided which, while the motorized arm 42 modifies the position of the component 102 on the support plate 21, removes (eliminates) the excess parts of the two opposite ends of the coil 12 (cut in the previous welding station S10).

Subsequently, the main conveyor 19 moves the carriage 20 (carrying one single component 102 within the seat 23) along the working path P1 and from the handling station S11 to the winding station S12, in which the carriage 20 stops and where a winding unit 35 (completely identical to the winding unit 35 provided in the winding station S3) winds, around the component 102 carried by the carriage 20, an externally insulated conductive wire 15 in order to obtain a series of turns making up the coil 11.

Subsequently, the main conveyor 19 moves the carriage 20 (carrying one single component 102 within the seat 23)

along the working path P1 and from the winding station S12 to the welding station S13 (arranged downstream of the winding station S12), in which the carriage 20 stops and where the two opposite ends of the coil 11 that has been wound in the previous winding station S12 are welded (for example by way of ultrasound, by way of heat sealing or by way of laser) to the two corresponding electrical contacts 8 by a welding unit 36 (completely identical to the welding unit 36 provided in the welding station S4).

Figure 19:
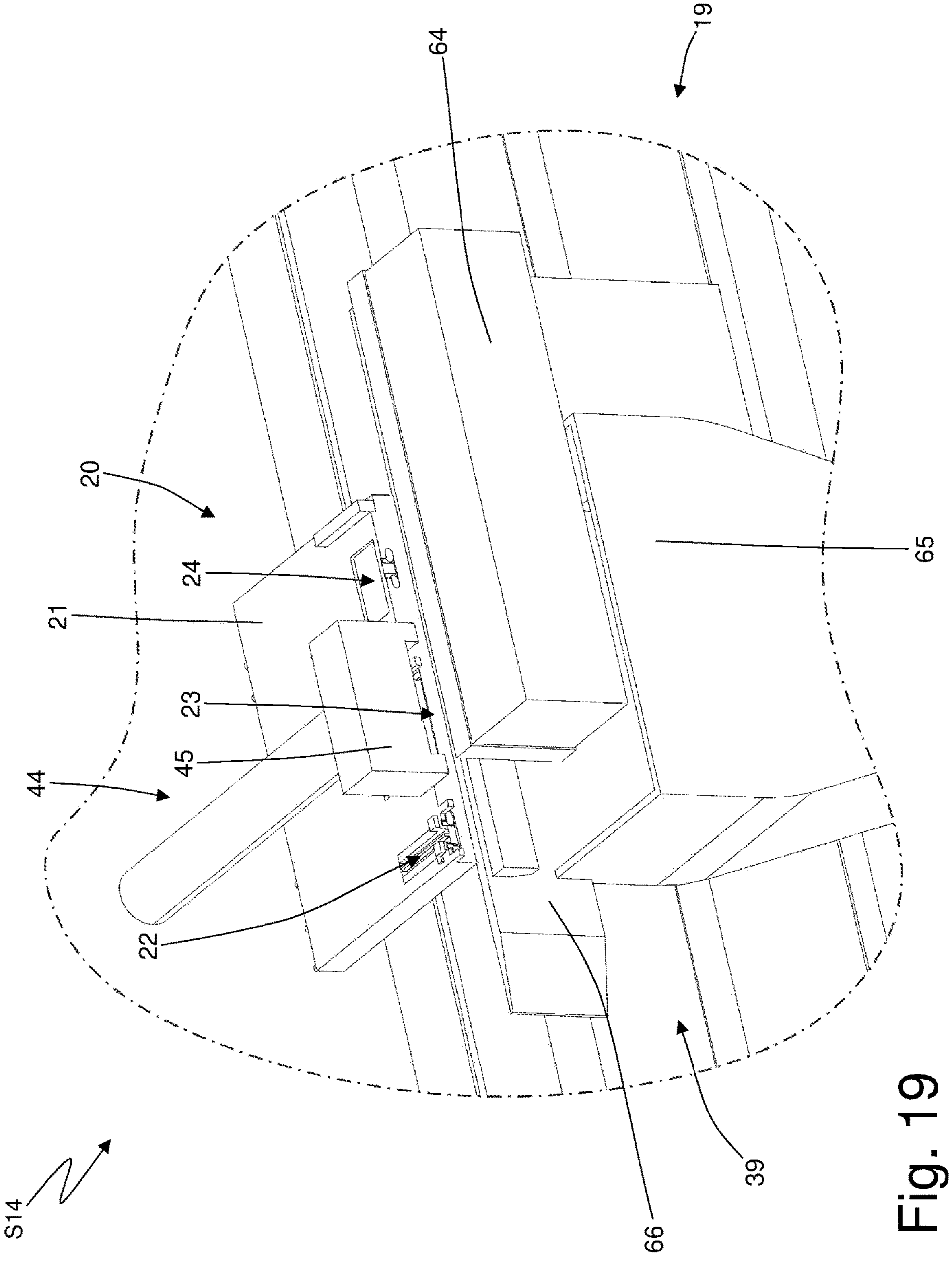

Subsequently, the main conveyor 19 moves the carriage 20 (carrying one single component 102 within the seat 23) along the working path P1 and from the welding station S13 to the handling station S14 (arranged downstream of the welding station S13), in which the carriage 20 stops and where the component 102 is rotated by 90° in order to finally be arranged in the seat 24 of the carriage 20 by resting the upper wall 2 on the support plate 21 (namely, with the lower wall 3 arranged horizontally and at the highest point). As illustrated in FIG. 19, in the handling station S14 a motorized arm 44 is provided, having a holding head 45 that is designed to grip the component 102 leaving the upper wall 2 completely free; when the carriage 20 is stopped in the handling station S14, the motorized arm 44 grips the component 102 arranged in the seat 23 of the carriage 20 and rotates the same on itself by 90° so as to rest the upper wall 2 on the support plate 21 and by moving the component 102 from the seat 23 to the seat 24 (previously the component 102 was arranged in the seat 23 and the rear wall 5 was resting on the support plate 21).

According to a preferred embodiment, in the handling station S14 a removal unit 39 (completely identical to the removal unit 39 provided in the handling station S5) is also provided which, while the motorized arm 44 modifies the position of the component 102 on the support plate 21, removes (eliminates) the excess parts of the two opposite ends of the coil 11 (cut in the previous welding station S13).

Subsequently, the main conveyor 19 moves the carriage 20 (carrying only one component 102 within the seat 24) along the working path P1 and from the handling station S14 to the winding station S15, in which the carriage 20 stops and where a winding unit 35 (completely identical to the winding unit 35 provided in the winding station S3) winds, around the component 102 carried by the carriage 20, an externally insulated conductive wire 15 in order to obtain a series of turns making up the coil 10.

Subsequently, the main conveyor 19 moves the carriage 20 (carrying one single component 102 within the seat 24) along the working path P1 and from the winding station S15 to the welding station S16 (arranged downstream of the winding station S15), in which the carriage 20 stops and where the two opposite ends of the coil 10 that has been wound in the previous winding station S15 are welded (for example by way of ultrasound, by way of heat sealing or by way of laser) to the two corresponding electrical contacts 8 by a welding unit 36 (completely identical to the welding unit 36 provided in the welding station S4).

Figure 20:
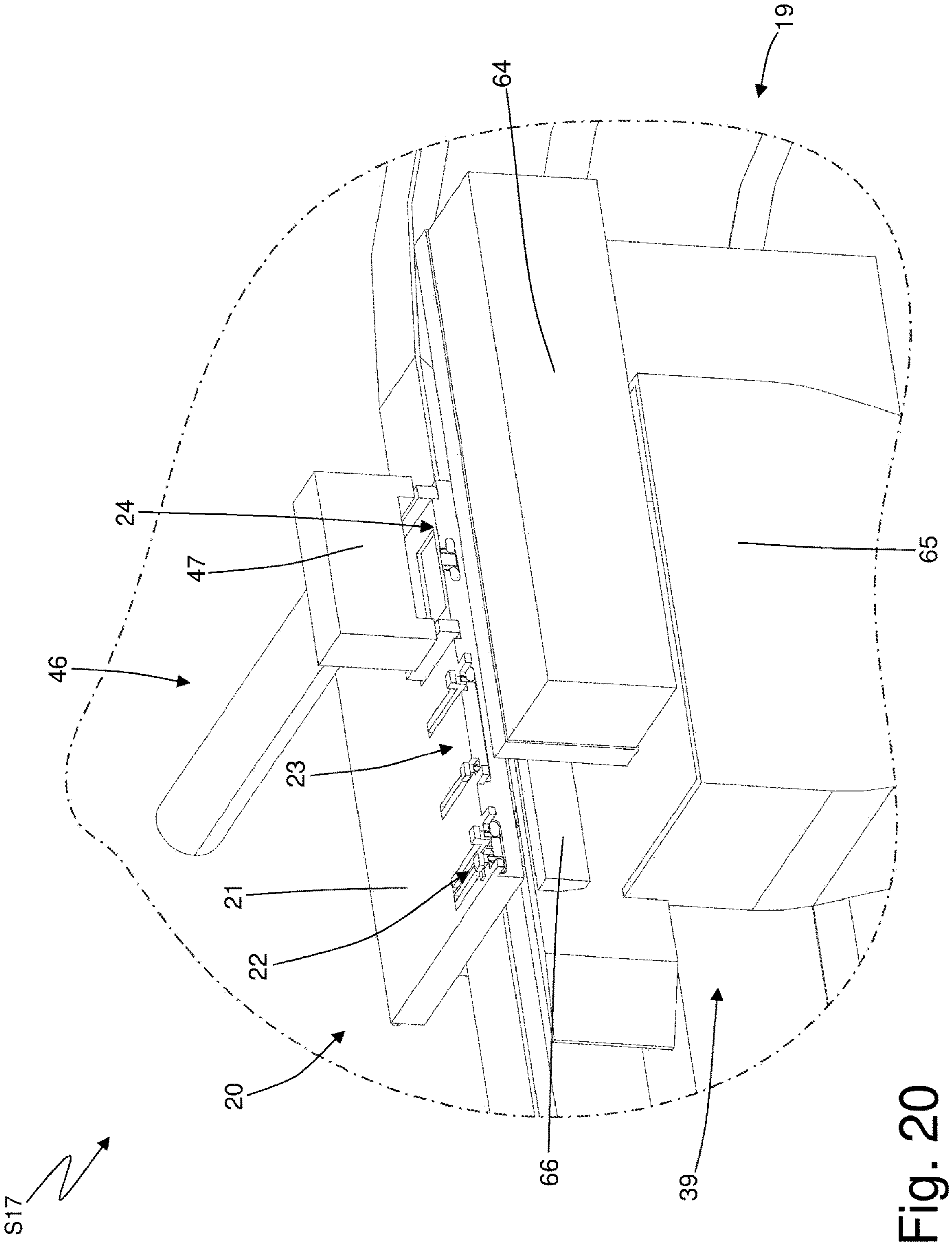

Subsequently, the main conveyor 19 moves the carriage 20 (carrying one single component 102 within the seat 24) along the working path P1 and from the welding station S16 to the handling station S17 (arranged downstream of the welding station S16), in which the carriage 20 stops and where the component 102 is overturned (namely, rotated on itself by 180°) in order to be finally arranged in the seat 24 of the carriage 20 by resting the lower wall 3 on the support plate 21 (namely, with the upper wall 2 arranged horizontally and at the highest point). As illustrated in FIG. 20, in the handling station S17 a motorized arm 46 is provided, having a holding head 47 which is designed to grip the component 102, leaving the upper wall 2 and the lower wall 3 completely free; when the carriage 20 is stopped in the handling station S17, the motorized arm 46 grips the component 102 arranged in the seat 24 of the carriage 20 and rotates the same on itself by 180° so as to rest the lower wall 3 on the support plate 21 (previously the upper wall 2, which is opposite the lower wall 3, was resting on the support plate 21).

According to a preferred embodiment, in the handling station S17 a removal unit 39 (completely identical to the removal unit 39 provided in the handling station S5) is also provided which, while the motorized arm 46 modifies the position of the component 102 on the support plate 21, removes (eliminates) the excess parts of the two opposite ends of the coil 10 (cut in the previous welding station S16).

Subsequently, the main conveyor 19 moves the carriage 20 (carrying only one component 102 within the seat 24) along the working path P1 and from the handling station S17 to the winding station S18, in which the carriage 20 stops and where a winding unit 35 (completely identical to the winding unit 35 provided in the winding station S3) winds, around the component 102 carried by the carriage 20, an externally insulated conductive wire 15 in order to obtain a series of turns making up the coil 9.

Subsequently, the main conveyor 19 moves the carriage 20 (carrying one single component 102 within the seat 24) along the working path P1 and from the winding station S18 to the welding station S19 (arranged downstream of the winding station S18), in which the carriage 20 stops and where the two opposite ends of the coil 9 that has been wound in the previous winding station S18 are welded (for example by way of ultrasound, by way of heat sealing or by way of laser) to the two corresponding electrical contacts 8 by a welding unit 36 (completely identical to the welding unit 36 provided in the welding station S4).

Subsequently, the main conveyor 19 moves the carriage 20 (carrying one single component 102 within the seat 24) along the working path P1 and from the welding station S19 to the output station S2 (arranged downstream of the welding station S19), in which the carriage 20 stops and where the component 102 is picked up from the seat 24 to be directed towards an outlet of the winding machine 18. As illustrated in FIG. 6, a motorized arm 48 provided with a holding head 49 is arranged in the output station S2 which is designed to grip the component 102 in order to pick up the component 102.

According to a preferred embodiment, in the output station S2 a removal unit 39 (completely identical to the removal unit 39 provided in the handling station S5) is also provided which, while the motorized arm 48 picks up the component 1, removes (eliminates) the excess parts of the two opposite ends of the coil 9 (cut in the previous welding station S19).

One single winding unit 35 is described in the following, since all six winding units 35 are substantially identical to one another and all work in the same way.

As illustrated in FIGS. 11-14, each carriage 20 comprises for each seat 22, 23 or 24 two clamps 50 and 51 (better illustrated in FIG. 9) which are mounted on the support plate 21 underneath the seat 22, 23 or 24 and are arranged side by side relative to one another. Each clamp 50 or 51 is designed to grip and lock a corresponding end of the wire 15 which is wound around the respective component 102 and is provided with one single movable jaw which moves back and forth along a horizontal holding direction D1 and perpendicular to the working path P1 (illustrated in FIG. 9).

In other words, each clamp 50 or 51 opens and closes by means of a movement that develops along the holding direction D1 and is therefore perpendicular to the working path P1 so that the clamps 50 and 51, by closing, bring the wire 15 into contact with the corresponding electrical contacts 8. In particular, in use the clamp 50 is used to grip an initial end of the wire 15 at the starting of the winding of the wire 15 around the component 102 (namely, before winding the wire 15 around the component 102 its initial end is gripped by the clamp 50); on the other hand, in use, the clamp 51 is used to grip a final end of the wire 15 at the end of the winding of the wire 15 around the component 102 (namely, after having completed the winding of the wire 15 around the component 102 its final end is gripped by the clamp 51).

The movable jaw of each clamp 50 or 51 is moved along the holding direction D1 by means of a control rod 52 (illustrated in FIG. 9) which is arranged across the support plate 21 and projects from the rear part of the support plate 21 so as to be pushed by an actuator device 53 (illustrated in FIG. 9) which is in a fixed position (namely, mounted on the frame of the winding machine 18) at each winding unit 35 (namely, at each winding station S3, S6, S9, S12, S15, S18). Preferably, each clamp 50 or 51 is normally closed, or in the absence of the intervention of the actuator device 53 it naturally remains closed; this result is obtained due to the presence of a spring which tends to push the movable jaw of each clamp 50 or 51 towards the closed position and is compressed by the action of the actuator device 53 (namely, the actuator device 53 must overcome the elastic force generated by the spring to move the movable jaw of each clamp 50 or 51 towards the open position).

In each winding unit 35 two clamps 54 and 55 (illustrated in FIGS. 13 and 14) are provided, which are mounted (on the frame of the winding machine 18 and therefore outside the main conveyor 19 so as not to move together with the carriages 20) underneath the support plates 21 of the carriages 20 and are arranged side by side relative to one another; in particular, the pair of clamps 54 and 55 is vertically aligned with a corresponding pair of clamps 50 and 51 carried by a carriage 20 that stops at the winding unit 35.

Each clamp 54 or 55 is designed to grip and lock a corresponding end of the wire 15 which is wound around the respective component 102 and is provided with one single movable jaw which moves back and forth along a holding direction D2 (illustrated in FIG. 9) horizontal and parallel to the working path P1 (namely, perpendicular to the holding direction D1 and illustrated in FIG. 7). In other words, each clamp 54 or 55 opens and closes by means of a movement that develops along the holding direction D2 and is therefore parallel to the working path P1. According to a preferred embodiment illustrated in the attached figures, the clamps 54 and 55 share a common jaw devoid of movement arranged between the clamps 54 and 55.

In particular, in use the clamp 54 is used to grip the initial end of the wire 15 at the starting of the winding of the wire 15 around the component 102 and (immediately) before the initial end of the wire 15 is gripped by the overlying clamp 50; instead, in use the clamp 55 is used to grip the final end of the wire 15 at the end of the winding of the wire 15 around the component 102 and (immediately) after the final end of the wire 15 is gripped by the overlying clamp 51.

Preferably, each clamp 54 or 55 is normally closed, namely, in the absence of the intervention of an actuator device it naturally remains closed; this result is obtained due to the presence of a spring which tends to push the movable jaw of each clamp 54 or 55 towards the closed position and is compressed by the action of the actuator device (namely, the actuator device must overcome the elastic force generated by the spring to move the movable jaw of each clamp 54 or 55 towards the open position).

Each winding unit 35 comprises a blade 56 (illustrated in FIGS. 12, 13 and 14) which is mounted (on the frame of the winding machine 18 and therefore outside the main conveyor 19 so as not to move together with the carriages 20) underneath the support plates 21 for the carriages 20 so as to be, in use, between a respective clamp 51 carried by a carriage 20 and a respective clamp 55. Each blade 56, in use, is movable along a cutting direction coinciding with the holding direction D2 (illustrated in FIG. 9), namely, each blade 56 moves back and forth by means of a movement parallel to the working path P1. Due to its position, each movable blade 56 can cut a final end of a wire 15 which is locked at a higher position by a respective clamp 51 carried by a carriage 20 and is locked at a lower position by a respective clamp 55.

Each winding unit 35 comprises a movable finger 57 (illustrated in FIGS. 12, 13 and 14) which is used to bring the wire 15 (with a vertical movement) close to the component 1, in order to wind (with a substantially horizontal movement) the wire 15 around the component 1, and therefore to remove (with a vertical movement) the wire 15 from the component 1. Each movable finger 57 has a tubular shape having a central hole which passes through the movable finger 57 from side to side and inside which the wire 15 is arranged; namely, the wire 15 enters from a rear opening of the movable finger 57 and exits from a front opening of the movable finger 57. For each movable finger 57, the wire 15 is progressively unwound from a coil contained in a suitable container, passes through a tensioning device provided with at least one movable dancer roller actuated by a spring and then reaches the movable finger 57; each tensioning device is configured to apply a constant tension to the respective wire 15.

The winding unit 35 comprises a common support body 58 (illustrated in FIG. 11) on which the movable finger 57 is mounted to move the movable finger 57; in particular, the movable finger 57 is rigidly mounted on the support body 58, namely, the movable finger 57 always moves in a single piece with the support body 58 and never performs any type of movement relative to the support body 58. The support body 58 is moved by one single actuator device 59 (schematically illustrated in FIG. 11) provided with (at least) its own independent electric motor. In use, each movable finger 57 is arranged with a horizontal orientation when the wire 15 must be moved vertically to rise as it moves towards the component 102 or to descend thus moving away from the component 1; moreover, in use, each movable finger 57 is arranged with a vertical orientation when the wire 15 must be horizontally moved in order to be wound around the component 1.

Each winding unit 35 comprises a containment body 60 (better illustrated in FIG. 13) which, in use, is arranged on the pin 16 so as to extend the pin 16 when the wire 15 must be bent around the pin 16 so as to prevent the wire 15 from accidentally escape from the pin 16; namely, a little before the wire 15 is bent by 90° around the pin 16, the containment body 60 is arranged on the pin 16 to extend the pin 16 and thus prevent the wire 15 from accidentally escaping from the pin 16. In this regard, it is important to note that the small pin 16 cannot have a too high extension (due to space problems that do not depend on the winding machine 18) and, at the same time, the movable finger 57, by moving, cannot pass too close to the component 102 to prevent that small positioning errors (combined with the constructive tolerances of the component 1) can cause accidental impacts of the movable finger 57 against the component 102.

Each winding unit 35 comprises a containment body 61 (better illustrated in FIG. 13) which in use is rested on the pin 17 so as to extend the pin 17 when the wire 15 must be bent around the pin 17 so as to prevent the wire 15 from accidentally escape from the pin 17; namely, a little before the wire 15 is bent by 90° around the pin 17, the containment body 61 is arranged on the pin 17 to extend the pin 17 and thus prevent the wire 15 from accidentally escaping from the pin 17. In this regard, it is important to note that the small pin 17 cannot have a too high extension (due to space problems that do not depend on the winding machine 18) and, at the same time, the movable finger 57, by moving, cannot pass too close to the component 102 to prevent that small positioning errors (combined with the constructive tolerances of component 1) can cause accidental impacts of the movable finger 57 against the component 102.

According to a preferred embodiment illustrated in the attached figures, each winding unit 35 comprises a further movable finger 62 (better illustrated in FIG. 13) which is arranged underneath the two clamps 54 and 55 and between the two clamps 54 and 55 (namely, underneath the common jaw devoid of movement arranged between the clamps 54 and 55) and is moved vertically in order to remove the initial end of the wire 15 which can remain inside the clamp 55 even when the clamp 55 is opened (the initial end of the wire 15 is very light and therefore often does not naturally descend by gravity out of the clamp 55); in this way, namely, due to the extraction action exerted by the movable finger 62, it is avoided that the initial end of the wire 15 can remain undesirably inside the clamp 55 and therefore tear off when the carriage 20 moves at the end of the winding. In particular, the clamp 55 is opened after the initial end of the wire 15 has been engaged by the clamp 54 to start a new winding and at this point the movable finger 62 performs a vertical working stroke downwards to remove the initial end of the wire 15 from the clamp 55.

The winding of a wire 15 around a component 102 in one single winding unit 35 is described in the following; obviously what happens in one single winding unit 35 takes place simultaneously and in exactly the same way also in the other winding units 35.

Initially, the winding unit 35 is empty (namely, devoid of the component 102 carried by a carriage 20), an initial end of the wire 15 is locked in the clamp 55, and the movable finger 57 (arranged horizontally) is arranged underneath the clamp 55. The initial end of the wire 15 locked in the clamp 55 is the initial end if referred to the new winding which will be made around the next component 102 that will arrive in the winding unit 35 and was, instead, the final end of the wire 15 if referred to the previous winding that has been completed around the previous component 102 that was previously in the winding unit 35. When the winding machine 18 is started after a replacement of the coils from which the wire 15 is unwound, an operator manually places the initial end of the wire 15 in the clamp 55.

Subsequently, the carriage 20 carries the component 102 into the winding unit 35, the clamp 50 and 54 open, the movable finger 57 (still arranged horizontally) moves vertically from the bottom to the top in order to pass the initial end of the wire 15 first through the clamp 54 and subsequently through the clamp 50, and finally the clamps 54 and 50 close to lock (in two different points) the initial end of the wire 15; preferably, first only the clamp 54 closes while the clamp 50 is still open and then the clamp 50 also closes. It is important to note that the clamp 50 opens and closes by means of a movement along the holding direction D1 that is perpendicular to the working path P1 and then, in the closing movement, the clamp 50 moves the wire 15 perpendicular to the working path P1 by pulling the wire 15 against the component 102 so that the wire 15 rests on a corresponding electrical contact 8.

Subsequently, the movable finger 57 rotates by 90° to move from a horizontal to a vertical orientation and start to rotate around the component 102 with a helical (spiral) rotation movement to wind the wire 15 around the component 1 (in geometry a helix is a curve in three-dimensional space, represented by a line wound at a constant angle around a cylinder). Before starting to wind the wire 15 around the component 1, the wire 15, which rises vertically towards the component 102 is bent by the movable finger 57 around the pin 16 that horizontally projects from the component 102 to give the wire 15 a 90° curve which deflects the wire 15 towards a horizontal orientation. In particular, the 90° rotation of the movable finger 57, which moves from a horizontal to a vertical orientation occurs at the same time as the wire 15 is bent around the pin 16. As previously mentioned, in this step the containment body 60 rests on the pin 16 so as to extend the pin 16 when the wire 15 must be bent around the pin 16 in order to prevent the wire 15 from accidentally escaping from the pin 16.

Subsequently, the movable finger 57 revolves several times around the component 102 to form, with the wire 15, a series of (vertically offset) turns around the component 1.

More or less when the winding of the wire 12 around the component 1 is started, the clamp 55 opens and the movable finger 62 performs a vertical working stroke downwards to remove the initial end of the wire 15 from the clamp 55.

When the end of the winding of the wire 15 around the component 102 approaches (namely, before completing the last turn of the winding), the containment body 60 is moved away from the component 102 and (preferably) the clamp 54 is opened to release the initial end of the wire 15 (whereas the clamp 50 remains well closed).

After finishing the winding of the wire 15 around the component 1, the movable finger 57 bends the wire 15 arranged horizontally around the pin 17 to give the wire 15 a 90° curve that deviates the wire 15 towards a vertical orientation. Simultaneously with the bending of the wire 15 around the pin 17, the movable finger 57 rotates by 90° to move from a vertical orientation to a horizontal orientation. As previously stated, in this step the containment body 61 rests on the pin 17 so as to extend the pin 17 when the wire 15 must be bent around the pin 17 so as to prevent the wire 15 from accidentally escaping from the pin 17.

When the end of the winding of the wire 15 around the component 102 approaches (namely, before completing the last turn of the winding), the clamp 51 is opened. The movable finger 57 by moving the wire 15 vertically from top to bottom after bending the wire 15 around the pin 17, makes the final end of the wire 15 pass through the open clamp 51 which immediately closes, thus locking the final end of the wire 15; subsequently, the movable finger 57 by moving the wire 15 vertically from top to bottom after bending the wire 15 around the pin 17 makes the final end of the wire 15 pass also through the open clamp 55 which immediately closes, thus locking the final end of the wire 15. It is important to note that the clamp 51 opens and closes by means of a movement along the holding direction D1, which is perpendicular to the working path P1 and therefore in the closing movement the clamp 51 moves the wire 15 perpendicular to the working path P1 by pulling the wire 15 against the component 102 so that the wire 15 rests on a corresponding electrical contact 8.

Subsequently, the containment body 61 moves away from the component 102 and the winding ends with the movement of the movable blade 56 which, by moving parallel to the working path P1, cuts the final end of the wire 15 after the final end of the wire 15 has been locked both by the clamp 51 and by the clamp 55 (namely, the movable blade 56 cuts the final end of the wire 15 between the portion locked at a higher position by the clamp 51 and the portion locked at a lower position by the clamp 55).

According to a possible embodiment, the winding of the wire 15 around the component 102 is carried out from the bottom upwards, therefore, before starting to wind the wire 15, the wire 15 that rises vertically towards the component 102 is bent around the pin 16 (arranged at a lower position) to give the wire 15 a 90° curve which deflects the wire 15 towards a horizontal orientation; moreover, after finishing the winding of the wire 15, the wire 15 arranged horizontally is bent around the pin 17 (arranged at a higher position) to give the wire 15 a 90° curve that deviates the wire 15 towards a vertical orientation. According to a different embodiment, the winding of the wire 15 around the component 102 is carried out from top to bottom, therefore, before starting to wind the wire 15, the wire 15 that rises vertically towards the component 102 is bent around the pin 16 (arranged at a higher position) to give the wire 15 a 90° curve which deflects the wire 15 towards a horizontal orientation; furthermore, after finishing the winding of the wire 15, the wire 15 arranged horizontally is bent around the pin 17 (arranged at a lower position) to give the wire 15 a 90° curve that deviates the wire 15 towards a vertical orientation. In this embodiment, the winding of the wire 15 around the component 102 occurs over a vertical section of the wire 15 which reaches the pin 16 (arranged at a higher position) and therefore helps to lock the initial end of the wire 15 against the component 102, thus ensuring greater winding stability.

Figure 15:
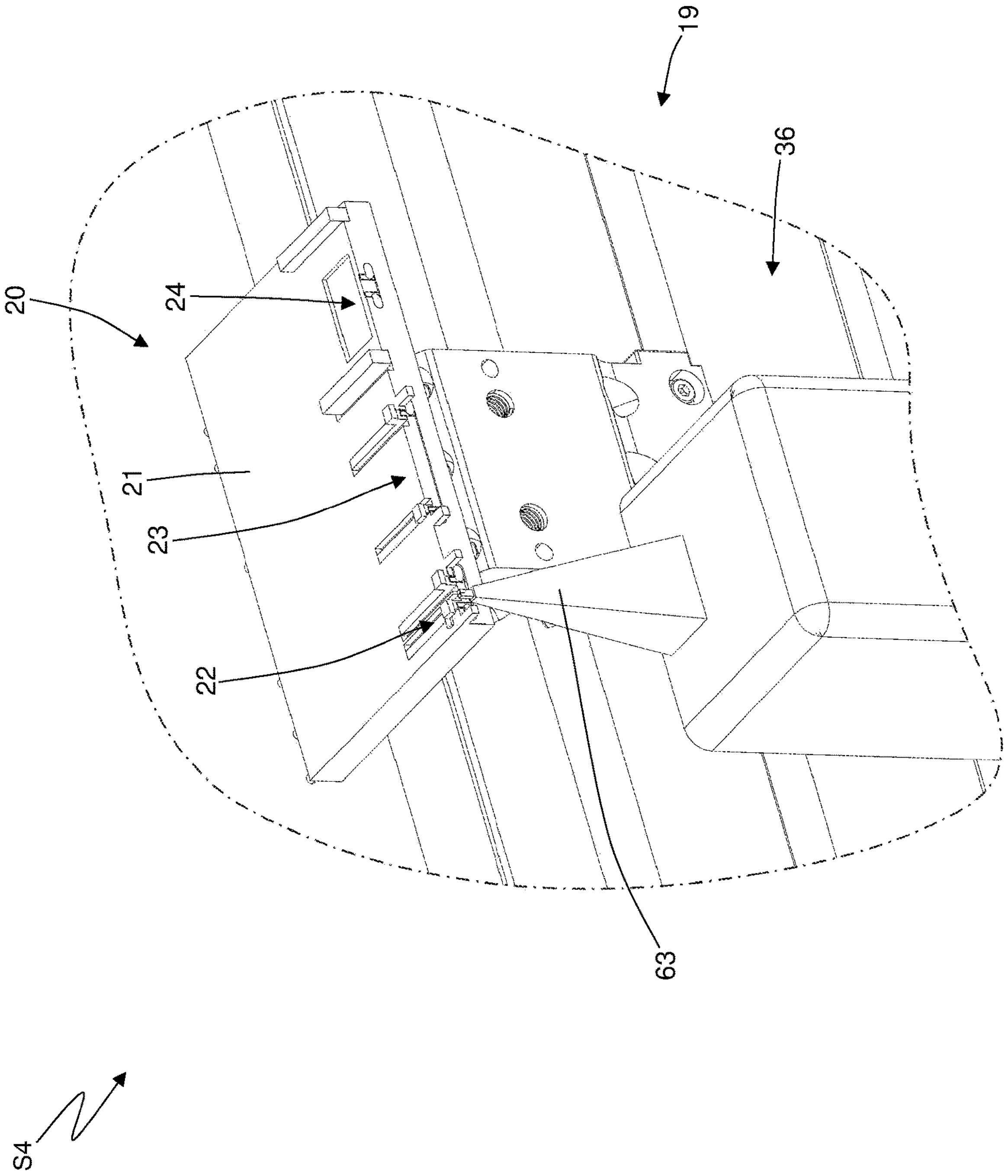
FIG. 15 is a perspective view and with the removal of parts for clarity of a welding station of the machine of FIG. 5.

As illustrated in FIG. 15, the welding station S4 comprises a corresponding welding unit 36 which is arranged in a fixed position (namely, it does not move together with the main conveyor 19) and is provided with a movable welding head 63 to move towards the component 102 carried by a carriage 20 stopped in the welding station S4 so as to be able to carry out the welding of the two ends of the wire 15 to the corresponding electrical contacts 8 and subsequently to move away from the component 102 carried by the carriage 20 once the welding is finished. The movement of the welding head 63 is always linear and can be oriented vertically (as occurs in the welding stations S4, S7, S10 and S13) or it can be oriented horizontally (as occurs in the welding stations S16 and S19) according to the orientation assumed by the component 1. The welding head 63 is provided with two welding elements arranged side by side to simultaneously weld both ends of the wire 15 to the corresponding electrical contacts 8. Preferably, the welding head 63 is also configured to cut the two ends of the wire 15 downstream of the welds with the two electrical contacts 8 so as to separate the excess part of the two opposite ends of the coil 9-14; namely, the welding head 63 is also provided with blades which cut the wire 15 downstream of the welds with the two electrical contacts 8.

As previously stated, in all six welding stations S4, S7, S10, S13, S16 and S19 the corresponding six welding units 36 are substantially identical to one another and the only relevant variation is the vertical orientation of the welding heads 63 in the welding stations S4, S7, S10 and S13 and the horizontal orientation of the welding heads 63 in the welding stations S16 and S19 to adapt to the different orientations of the components 1.

As illustrated in FIG. 16, the handling station S5 comprises a corresponding removal unit 39 provided with a blower device 64 which is connected to a common compressed air distributor and is configured to generate a jet of compressed air which is directed from top to bottom and strikes a corresponding component 102 carried by a carriage 20 stopped in the removal station S5. The jet of compressed air strikes from top to bottom a corresponding component 102 carried by a carriage 20 stopped in the removal station S5 and therefore pushes downwards the excess parts of the two opposite ends of the coil 9-14 (cut in the previous welding station S4); preferably, the excess parts of the two opposite ends of the coil 9-14 pushed downwards by a jet of compressed air are collected in a container 65 that is located under the carriage 20. According to a preferred embodiment, the removal unit 39 also comprises a clamp 66 which is arranged in a fixed position (namely, externally to the main conveyor 19) under the support plate 21 of a stopped carriage 20 and clamps the excess parts of the two opposite ends of the coil 9-14 waiting for the excess parts to be directed inside the container 65 by the jets of air.

As previously stated, in all five handling stations S5, S8, S11, S14, S17 and S19 and in the output station S2 the corresponding six removal units 39 are substantially identical to one another.

In the embodiment described above, in the five handling stations S5, S8, S11, S14, S17 and S19 each component 102 is rotated by 90° or 180° around a horizontal rotation axis; according to other embodiments, in one or more handling stations S5, S8, S11, S14, S17 and S19 each component 102 is rotated around several different rotation axes: for example each component 1 is first rotated by 90° or 180° (or even a different angle such as 45°, 75° or others) around a horizontal rotation axis and then is rotated by 90° or 180° (or even a different angle such as 45°, 75° or others) around a vertical rotation axis.

In the non-limiting embodiment described above, the component 102 is part of a disposable cartridge of an electronic cigarette, but the method to manufacture coils 9-14 described above can find application for the production of components for articles of any type (namely, of any merchandise category). For example, the method to manufacture coils 9-14 described above can be applied to the production of components for a machine, an equipment system, a construction unit, a product (e.g., a payment device) for example, but not only, in the tobacco, pharmaceutical, food or entertainment field; more in general, the method to manufacture coils 9-14 described above can be applied to the production of components for applications of any type.

As previously described, in each winding station S3, S6, S9, S12, S15, S18, the wire 15 is directly wound around the component 102 by revolving (with a helical rotation movement) the movable finger 57, which slidingly engages the wire 15, several times around the component 102; in other words, each coil 9-14 is manufactured directly around the component 102 by making the movable finger 57, which engages the wire 15 in a sliding manner, revolve several times around the component 102 with a helical rotation.

The automatic machine 18 works by performing in succession the work cycles (or machine cycles) which are repeated in always the same way in all the stations S1-S19 of the automatic machine 18 and all have the same time duration (namely, the same cycle time which is the unit of time between the occurrence of an event and its repetition). For example, when the automatic machine 18 works with 60 cycles/minute, then each work cycle (or machine cycle) lasts one second. All the stations S1-S19 of the automatic machine 18 are bound to the same time duration of the work cycles and therefore in each station S1-S19 of the automatic machine 18 all the operations carried out must have the same time duration equal to the time duration of each work cycle; it is therefore evident that the time duration of each work cycle is imposed by the station S1-S19 of the slowest automatic machine 18 (namely, by the winding stations S3, S6, S9, S12, S15, S18) and that all the other stations S1-S19 of the automatic machine 18 must adapt by slowing down their operations or by inserting idle waiting times.

A work cycle of the automatic machine 18 (machine cycle) ranges from an initial instant in which a carriage 20 carrying the component 102 devoid of the coil 9-14 arrives at a winding station S3, S6, S9, S12, S15, S18 to a final instant, in which the carriage 20 carrying the component 102 provided with the coil 9-14 (recently manufactured) leaves the winding station S3, S6, S9, S12, S15, S18. In each winding station S3, S6, S9, S12, S15, S18, the wire 15 is directly wound around the component 102 being made to rotate around the component 102 with a helical rotation during a winding step which constitutes a fraction of the work cycle of the automatic machine 18.

Namely, in each winding station S3, S6, S9, S12, S15, S18, during the work cycle of the automatic machine 18, in addition to the winding step (in which the wire 15 is directly wound around the component 102 with a helical rotation) other steps must also be carried out, which precede or follow the winding step.

For example, before the winding step a carriage 20 must have time to stop in the correct position inside the winding station S3, S6, S9, S12, S15, S18, the clamp 55 must have time to open, and the finger 15 must have time to go upwards towards the component 102; namely, before the winding step, the following steps are provided: a stopping step of the carriage, an opening step of the clamp 55, and an upward step of the finger 15.

On the other hand, after the winding step, the finger 15 must have time to descend by moving away from the component 102, the clamp 54 must have time to close, the blade 56 must have time to cut the wire 15, and the carriage 20 must have time to restart (set in motion) from the winding station S3, S6, S9, S12, S15, S18; namely, after the winding step, the following steps are provided: a downward step of the finger 15, a closing step of the clamp 54, a cutting step of the wire 15, and a restarting step of the carriage 20.

According to a preferred embodiment, the time duration of the winding step during which the wire 15 is directly wound around the component 102 with a helical rotation ranges from 50% to 70% of a total time duration of the work cycle (machine cycle) of the automatic machine 18; namely, the great majority (more than half) of the total time duration of the work cycle (machine cycle) of the automatic machine 18 is involved in the winding step during which the wire 15 is directly wound around the component 102 with a helical rotation and the remaining time of the overall time duration of the work cycle (machine cycle) of the automatic machine 18 is dedicated to all the other necessary (peripheral) operations (that is, preparatory for carrying out the winding step and preparatory for allowing the new winding step to be carried out).

According to a preferred embodiment, the time duration of the winding step during which the wire 15 is directly wound around the component 102 with a helical rotation by revolving the movable finger 57 ranges from 25% to 40% of an overall time duration for the production of the component 102 consisting of several work cycles of the automatic machine 18. Namely, the overall time duration of the production of the component 102 is constituted by the sum of all the machine cycles necessary to perform all the operations required for the production of the component 102 (at least the winding of the wire 15 and the subsequent welding of the wire 15 to which can be added, for example, quality controls) and the time duration of the winding step ranges from 25% to 40% of the total time duration of the production of the component 102.

According to a different embodiment not illustrated, each winding station S3, S6, S9, S12, S15, S18 works in parallel to obtain, by winding, respective coils 9-14 at the same time, with a first number of components 102 that is an integral multiple, preferably double, relative to a second number of components 1 with which the welding station S4, S7, S10, S13, S16, S19 works, forming respective welds. In this embodiment, the first number ranges from two to ten and, hence, the second number ranges from one to five.

As illustrated in FIG. 2, the production plant 1 comprises the winding machine 18 which forms the six coils 9-14 around each component 102 (but the number of coils 9-14 could be different).

In addition, the production plant 1 comprises a control machine 67 which is arranged immediately downstream of the winding machine 18 to directly receive the components 102 provided with the six coils 9-14 from the winding machine 18 (as better described in the following) and then carry out a control on the components 102 provided with the six coils 9-14 (in particular to verify that in each component 102 the six coils 9-14 are all functioning correctly).

The production plant 1 comprises a belt conveyor 68 which directly receives the components 102 controlled by the control machine 67 and moves the controlled components 102 towards a subsequent assembling machine 69 which composes (assembles) each disposable cartridge 100 by joining the components 101-106. The assembling machine 69 comprises a conveyor 70 of the linear motor type (better illustrated in FIG. 23 and similar to the main conveyor 19 of the winding machine 18) which moves each disposable cartridge 100 as it is assembled by joining the components 101-106.

Coupled to the assembling machine 69 a control machine 71 is provided, which carries out a control on the disposable cartridges 100 during assembly by taking the cartridges 100 during assembly from the conveyor 70 of the assembling machine 69 and then re-introducing the disposable cartridges 100 during assembly on the conveyor 70 of the assembling machine 69.

The production plant 1 comprises two belt conveyors 72 and 73, which both originate from an outlet of the assembling machine 69 and diverge to feed the disposable cartridges 100 to two twin control machines 74 and 75 which carry out a control on the disposable cartridges 100: half of the disposable cartridges 100 leaving the assembling machine 69 are fed to the control machine 74 by the conveyor 72 and the other half of the disposable cartridges 100 leaving the assembling machine 69 are fed to the control machine 75 by the conveyor 73. The two twin control machines 74 and 75 are arranged aligned one behind the other with an arrangement that reduces the longitudinal bulk of the production plant 1.

The production plant 1 comprises two twin control machines 76 and 77 which carry out a control on the disposable cartridges 100 and are arranged aligned one behind the other: the control machine 74 directly feeds the disposable cartridges 100 to the control machine 76 while the control machine 75 directly feeds the disposable cartridges 100 to the control machine 77.

The production plant 1 comprises two twin control machines 78 and 79 which carry out a control on the disposable cartridges 100 and are arranged aligned one behind the other: the control machine 76 directly feeds the disposable cartridges 100 to the control machine 78 while the control machine 77 directly feeds the disposable cartridges 100 to the control machine 79.

Figure 26:
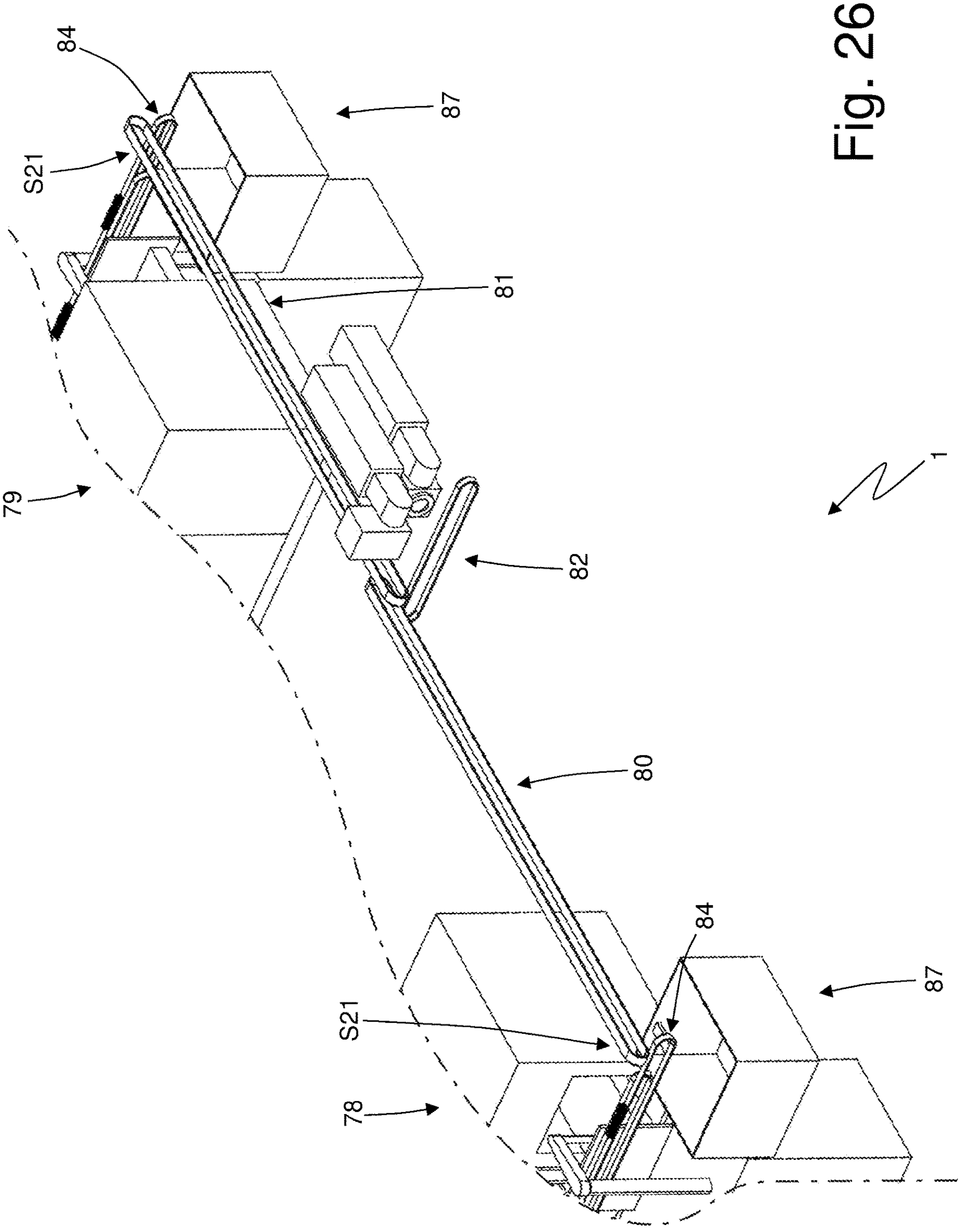
FIG. 26 is a perspective and schematic view of an outlet area of the production plant of FIG. 2.

As better illustrated in FIG. 26, the production plant 1 comprises two twin belt conveyors 80 and 81 which are parallel to one another and converge towards one another and a belt output conveyor 82 which is perpendicular to the belt conveyors 80 and 81 and is arranged between the two belt conveyors 80 and 81: the belt conveyor 80 transfers the disposable cartridges 100 from the control machine 78 to the output conveyor 82 while the belt conveyor 81 transfers the disposable cartridges 100 from the control machine 79 to the output conveyor 82.

The control machines 67, 71 and 74-79 have the same identical structure and differ from one another only for a different location in the production plant 1, for a different size, and for the type of controls that are carried out; for this reason, only the structure of the control machine 67 will be described in detail in the following, since this structure is found to be the same in all the other control machines 71 and 74-79.

The peculiar characteristic of all the control machines 67, 71 and 74-79 is to carry out the simultaneous control of a group of articles (which can be the single components 102 or the disposable cartridges 100) formed by a relatively high number of articles: the control machine 67 simultaneously controls sixteen components 102, the control machine 71 simultaneously controls twenty disposable cartridges 100, each control machine 74 or 75 simultaneously controls fourteen disposable cartridges 100, each control machine 76 or 77 simultaneously controls eight single-use cartridges 100, and each control machine 78 or 79 simultaneously controls five single-use cartridges 100. It is important to note that, in order not to form a "bottleneck" for the production plant 1, a control machine 67, 71 and 74-79 must simultaneously control how many articles there are as well as the length of time required to carry out the control.

Figure 21:
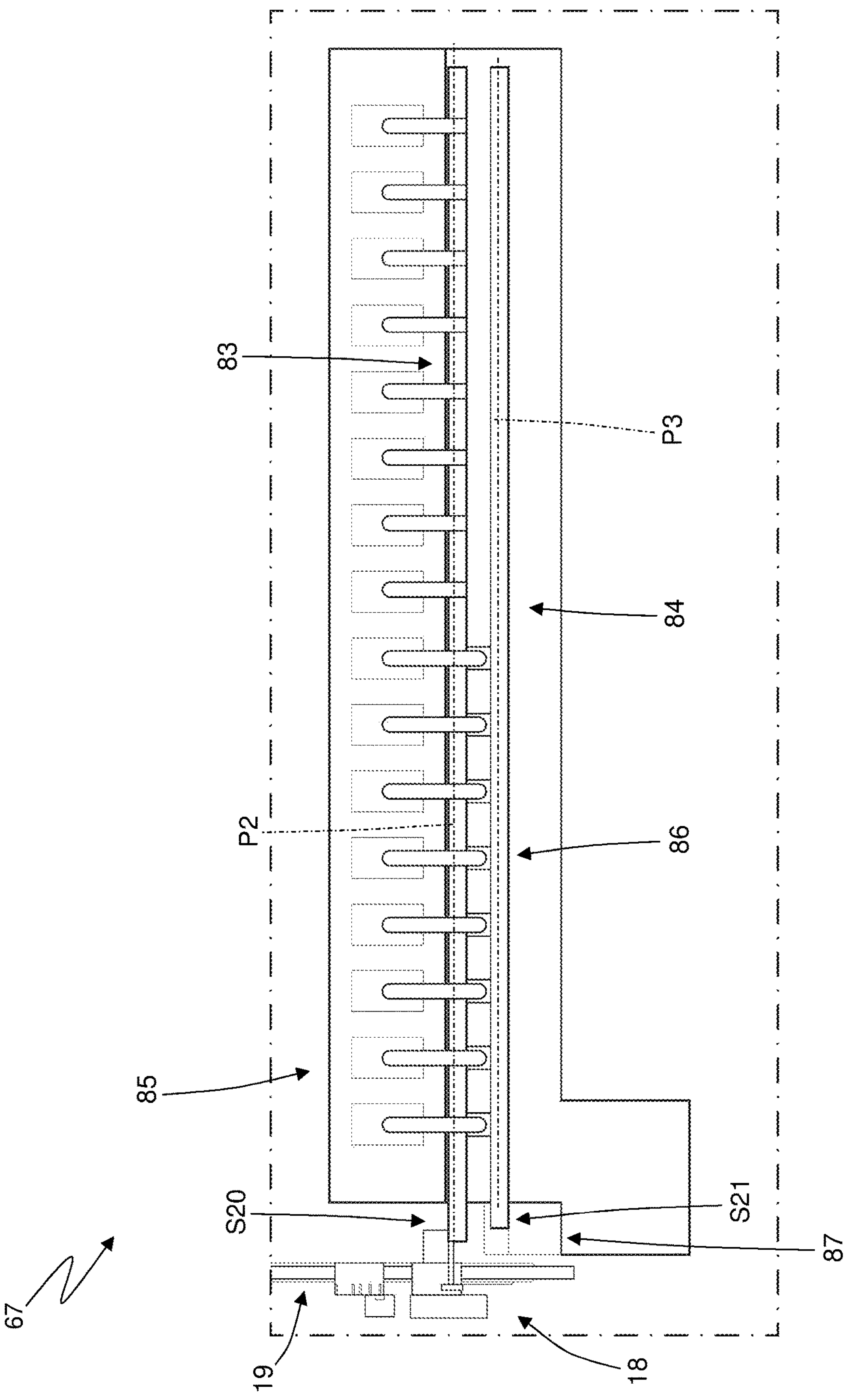
FIG. 21 is a plan and schematic view of a first control machine of the production plant of FIG. 2.
Figure 22:
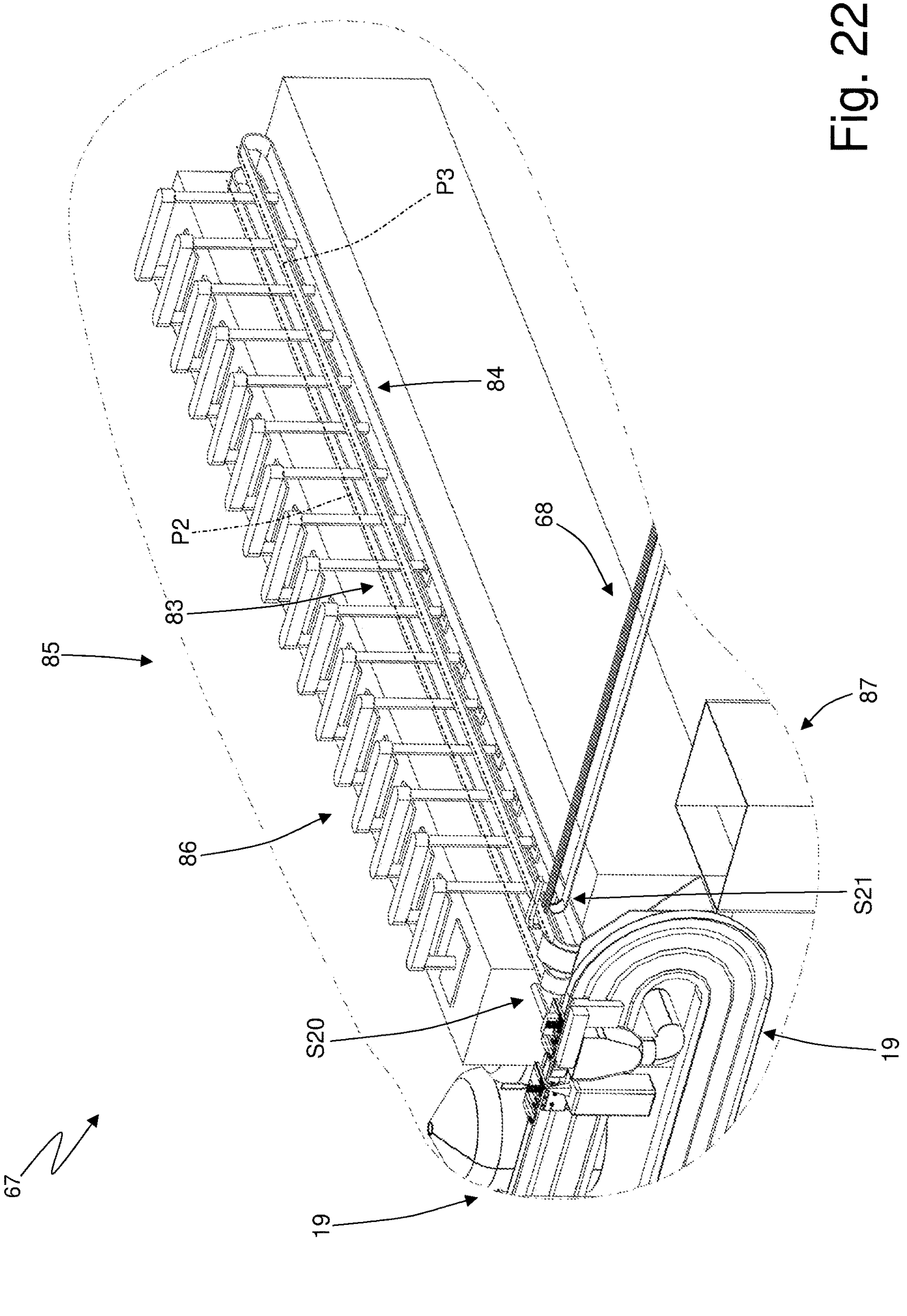
FIG. 22 is a perspective and schematic view of the first control machine of FIG. 22.

As illustrated in FIGS. 21 and 22, the control machine 67 comprises an initial belt conveyor 83 configured to move the components 102 along an initial path P2 which starts in an input station S20 arranged at the end of the working path P1 defined by the main conveyor 19 of the winding machine 18; the initial path P2 is perpendicular to the working path P1. Furthermore, the control machine 67 comprises a final belt conveyor 84 configured to move the components 102 along a final path P3 which is parallel and next to the initial path P2 (and therefore is perpendicular to the working path P1) and ends in an output station S2 arranged at the beginning of the conveyor 68 which carries the components 102 towards the assembling machine 69. In other words, the two conveyors 83 and 84 are arranged side by side.

The control machine 67 comprises a control unit 85 configured to carry out the simultaneous control of all the components 102 of the group of components 102 (namely, of sixteen components 102 at a time). Furthermore, the control machine 67 comprises a transferring device 86 configured both to simultaneously transfer a whole group of (sixteen) components 102 to be controlled from the initial conveyor 83 to the control unit 85, and to simultaneously transfer a whole group of (sixteen) components 102 controlled by the control unit 85 to the final conveyor 84. Namely, the transferring device 86 alternately "loads" the control unit 85 by simultaneously transferring a whole group of (sixteen) components 102 to be controlled to the control unit 85 and "unloads" the control unit 85 by simultaneously transferring, from the control unit 85, a whole group of (sixteen) controlled components 102 to the final conveyor 84.

In the embodiment illustrated in the attached figures, one single transferring device 86 is provided, which alternately performs both functions: "loading" the control unit 85 by simultaneously transferring a whole group of (sixteen) components 102 to be controlled from the initial conveyor 83 to the control unit 85 and "unloading" the control unit 85 by simultaneously transferring, from the control unit 85, a whole group of (sixteen) controlled components 102 to the final conveyor 84. In this embodiment, preferably, the control unit 85 is arranged on the same side relative to the initial conveyor 83 and to the final conveyor 84 (namely, the control unit 85 is not arranged between the initial conveyor 83 and the final conveyor 84).

According to a different embodiment not illustrated, two transferring devices are provided which are separate and independent from one another: a first transferring device "loads" the control unit 85 by simultaneously transferring a whole group of (sixteen) components 102 to be controlled from the initial conveyor 83 to the control unit 85, and the second transferring device "unloads" the control unit 85, by simultaneously transferring, from the control unit 85, a whole group of (sixteen) controlled components 102 to the final conveyor 84. In this embodiment, preferably, the control unit 85 is arranged between the initial conveyor 83 and the final conveyor 84.

Therefore, in general, two transferring devices are provided which are different, separate and independent from one another or one single transferring device 86 is provided, which alternatively performs the function of the first transferring device and the function of the second transferring device (namely, the first transferring device coincides with the second transferring device).

The main conveyor 19 of the winding machine 18 moves a plurality of components 102 along a working path P1; in the input station S20 arranged along the main path P1, the components 102, from the main conveyor 19 of the winding machine 18, are transferred (by the motorized arm 48) to the initial conveyor 83 of the control machine 67 until forming, in the initial conveyor 83 of the control machine 67, the group of (sixteen) components 102 formed by a given number (sixteen) of components 102. Preferably, in the input station 51 only one component 102 is transferred at a time from the main conveyor 19 of the winding machine 18 to the initial conveyor 83 of the control machine 67.

In the output station S21, the components 102 are transferred from the final conveyor 84 of the control machine 67 to the conveyor 68 which moves a plurality of components 102 along a corresponding path. Preferably, in the output station S21 only one component 102 at a time is transferred from the final conveyor 84 of the control machine 67 to the conveyor 68.

In the control machine 67, the initial conveyor 83 moves the components 102 in the opposite direction relative to the final conveyor 84 and the input and output stations S20 and S21 are arranged next to one another at the same end of the initial and final conveyors 83 and 84; in the control machine 67, the input station S20 receives the components 102 from the main conveyor 19 of the winding machine 8 and the output station S21 transfers the components 102 to the conveyor 68. Namely, in the control machine 67 the components 102 move back and forth along the control machine 67.

Figure 23:
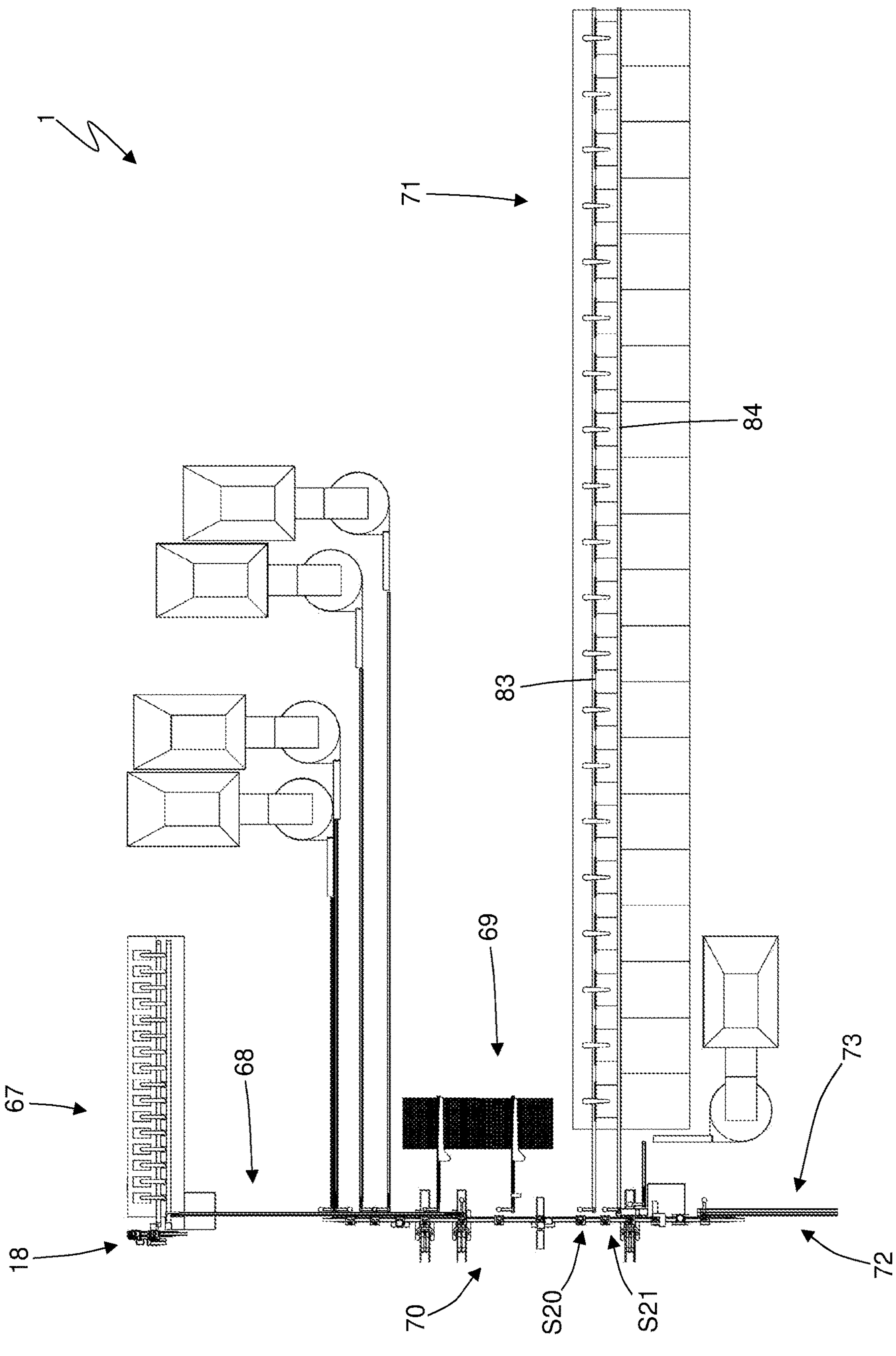
FIG. 23 is a plan and schematic view of an assembling machine and a of a second control machine of the production plant of FIG. 2.
Figure 24:
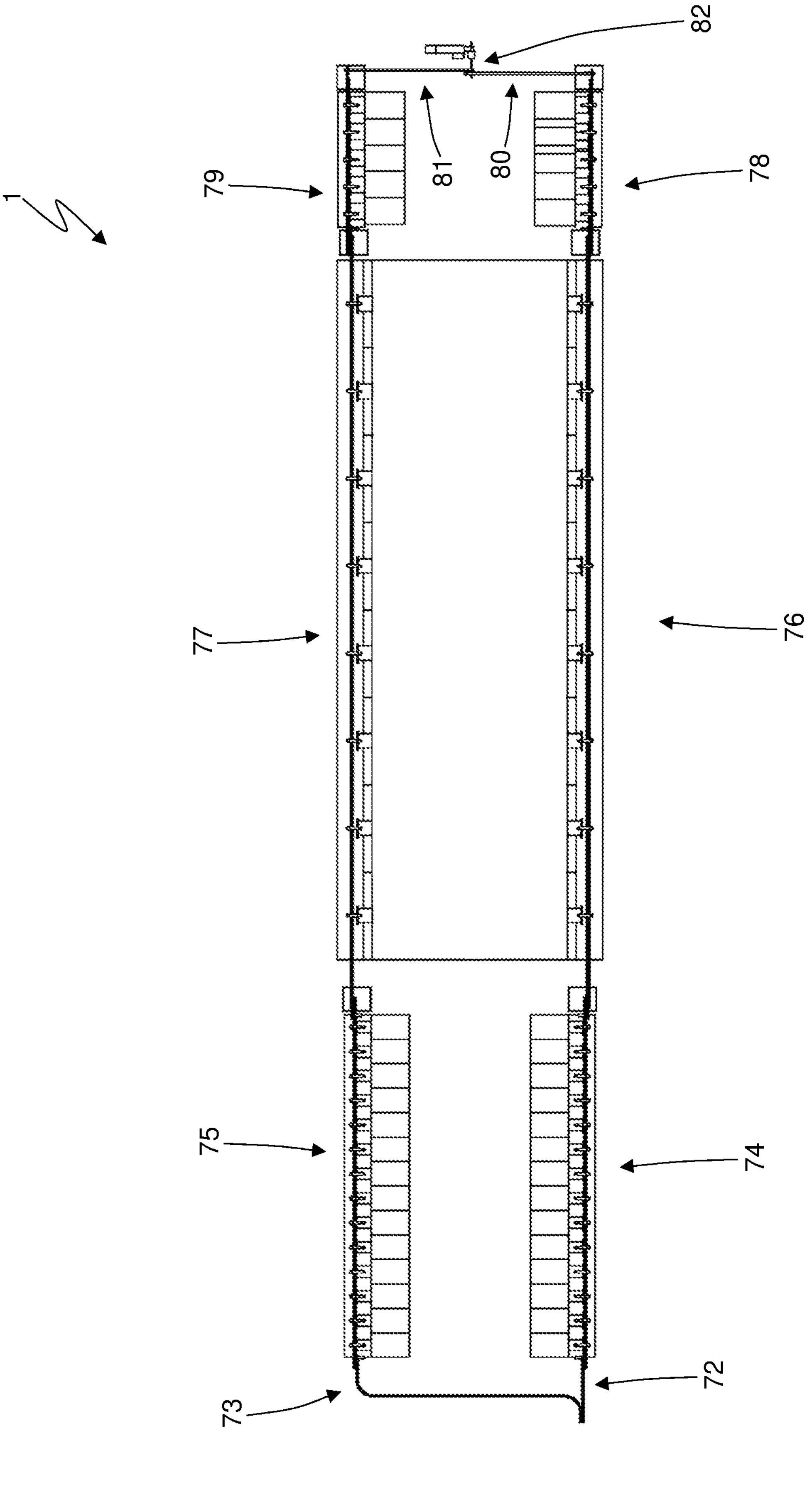
FIG. 24 is a plan and schematic view of further control machines of the production plant of FIG. 2.

In the control machine 71 and as illustrated in FIG. 23, the initial conveyor 83 moves the disposable cartridges 100 in the opposite direction relative to the final conveyor 84 and the input and output stations S20 and S21 are arranged next to one another at the same end of the initial and final conveyors 83 and 84; in the control machine 71, the input station S20 receives the disposable cartridges 100 from the conveyor 70 of the assembling machine 69 and the output station S21 releases the disposable cartridges 100 back again to the conveyor 70 of the assembling machine 69. In other words, the control machine 71 is inserted "inside" the assembling machine 69 to pick up the disposable cartridges 100 being processed from the conveyor 70 of the assembling machine 69 and then re-insert the disposable cartridges 100 being processed in the conveyor 70 of the assembling machine 69. Namely, in the control machine 71 the cartridges 100 move back and forth along the control machine 71.

In other words, in the assembling machine 69 the conveyor 70 moves a plurality of disposable cartridges 100 along a path which is perpendicular to the initial path P2 and to the final path P3 of the corresponding control machine 71. In the input station S20 arranged along the path of the conveyor 70, the disposable cartridges 100 are transferred from the conveyor 70 to the initial conveyor 83 until the group of (twenty) disposable cartridges 100 formed by a given number (twenty) of disposable cartridges 100 is formed in the initial conveyor 83. In the output station S21 arranged along the path of the conveyor 70 downstream of the input station 51, the disposable cartridges 100 are transferred from the final conveyor 84 to the conveyor 70.

Figure 25:
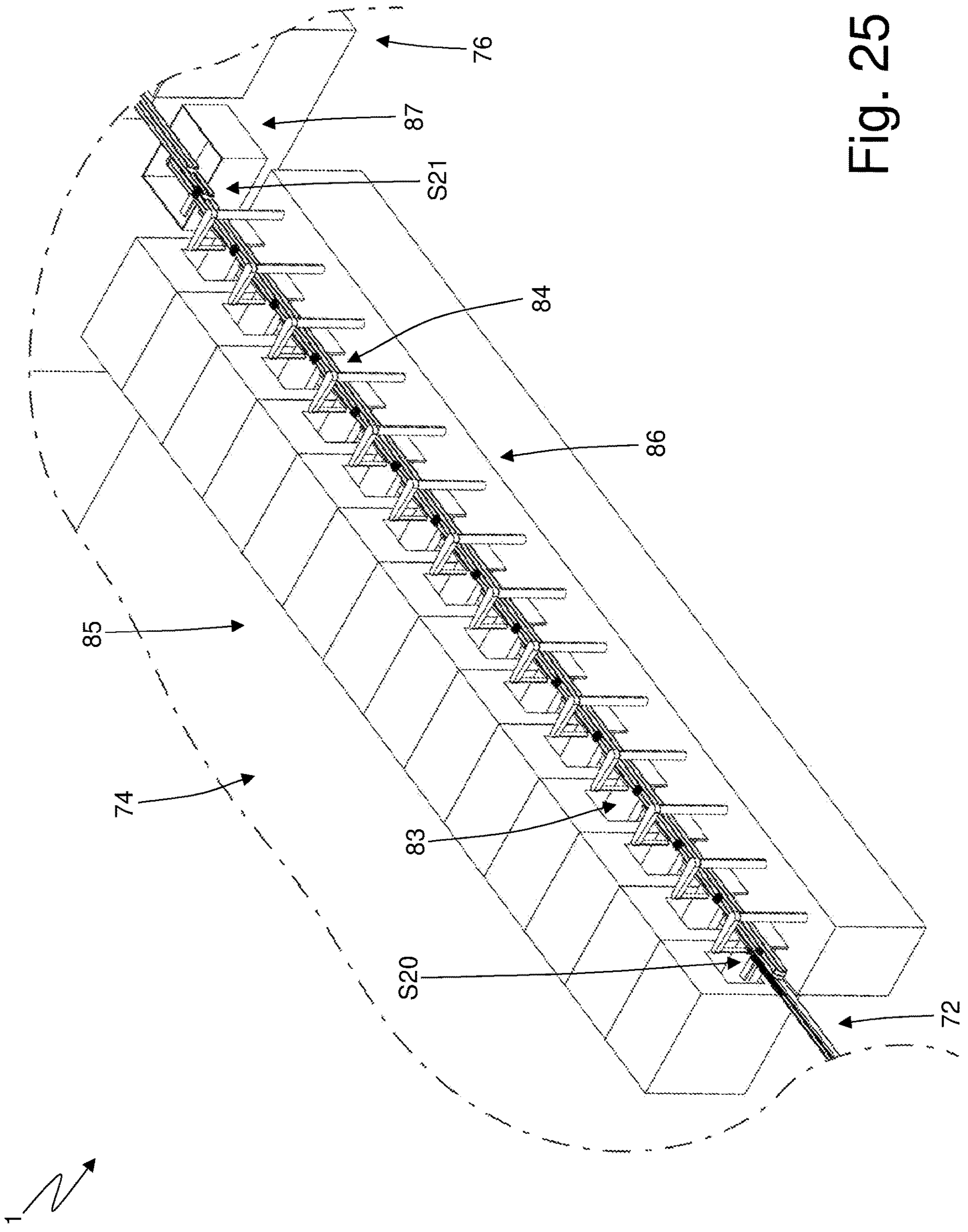
FIG. 25 is a perspective and schematic view of a control machine of FIG. 24.

As illustrated for example in FIG. 25, in the control machines 74-79 the initial conveyor 83 moves the cartridges 100 in the same direction as the final conveyor 84 and therefore the input and output stations S20 and S21 are arranged at opposite ends of the initial and final conveyors 83 and 84. Namely, in the control machines 74-79 the cartridges 100 cross from side to side along the control machines 74-79.

According to a preferred embodiment, any defective component 102 is rejected while the defective component 102 is in the final conveyor 84; in particular, the final conveyor 84 moves a defective component 102 beyond the output station S21 to a reject station arranged downstream of the output station S21 and in which the component 102 is fed (normally by gravity) towards an underlying collecting container 87 (illustrated in FIGS. 21-22 and 25-26).

To summarize, the control machine 67 carries out a control on a group of components 102 formed by a plurality (in particular sixteen) of components 102. In the control machine 67 the initial conveyor 83 moves a plurality of components 102 along an initial path P2 starting in the input station S20, the transferring device 86 simultaneously transfers the whole group of (sixteen) components 102 to be controlled from the initial conveyor 83 to the control unit 85, the control unit 85 carries out the simultaneous control of all (sixteen) components 102 of the group of components 102; the transferring device 86 simultaneously transfers the whole group of (sixteen) components 102 controlled by the control unit 85 to the final conveyor 84, and finally the final conveyor 84 moves the components 102 along the final path P3 which is parallel and beside the initial path P2 and ends at the output station S21.

In the embodiment illustrated in the attached figures, the wire 15 is electrically conductive, is externally insulated, and is wound to form (at least) one coil 9-14 which forms a helical antenna for electromagnetic interactions that can be intended for the exchange (transmission) of information or can be intended for generating electricity by electromagnetic induction. According to a different embodiment, the wire 15 is electrically conductive (and therefore is designed to be crossed by an electric current, although of low or very low intensity) but has a textile core (for example made of cotton), which is made conductive, for example by means of a doping with metal nanoparticles. According to a further embodiment, the wire 15 is not electrically conductive, it is of the textile type and the (at least) one coil 9-14 constitutes a wick (or the like) for an electric cigarette.

The embodiments described herein can be combined with one another without departing from the scope of the present invention.

The method to manufacture the coils 9-14 described above has numerous advantages.

First of all, the method to manufacture the coils 9-14 described above allows to work at a high operating speed (measured as the number of components produced in the unit of time).

Furthermore, the method to manufacture the coils 9-14 described above allows to maintain a high production quality (generally measured as a percentage of defective pieces).

The method to manufacture the coils 9-14 described above is relatively simple and inexpensive to implement.

Finally, the method to manufacture the coils 9-14 described above allows to avoid frequent breakages of the wire 15 during the winding of the wire 15.

These results are obtained due to the fact of winding each coil 9-14 (which has a reduced number of turns and is made up of a very thin wire 15) directly around the corresponding component 102 and, at the same time, combining both a particularly gentle mechanical treatment of the wire 15, and by dedicating a very long time to the direct winding of the wire 15 (namely, to the helical rotation of the wire 15 around the component 102) (if compared to the time duration of the entire work cycle, or of the entire machine cycle). In fact, by dedicating a very long time to the winding of the wire 15 (namely, the helical rotation of the wire 15 around the component 102), (if compared to the time duration of the entire work cycle, namely, the entire machine cycle), it is possible to limit the accelerations to which the wire 15 is subjected and therefore the forces which act on the wire 15 during the winding while operating at a high operating speed. In other words, it is possible to almost completely eliminate the risk of accidental breakage of the wire 15 during the winding step (that is, during the helical rotation of the wire 15 around the component 102) if the winding step is carried out at relatively low speeds (that is, by taking a relatively long time).

The invention claimed is:

1. A method to manufacture a coil (9-14) around a component (102) of an article (100) using an automatic machine (18) and comprising the steps of:

moving, by means of a main conveyor (19) and along a working path (P1), a carriage (20) provided with a seat (22, 23, 24) designed to house the component (102);

placing, in an input station (S1) arranged along the working path (P1), the component (102) in the seat (22, 23, 24) of the carriage (20);

coupling, in a winding station (S3, S6, S9, S12, S15, S18) arranged along the working path (P1) downstream of the input station (S1), a wire (15) around the component (102) in order to obtain a series of turns making up the coil (9-14);

locking an initial end of the wire (15) by means of a first clamp (50), which is integral with the carriage (20), before starting to wind the wire (15); and locking a final end of the wire (15) by means of a second clamp (51), which is integral with the carriage (20) at the final end of the winding of the wire (15), wherein the wire (15) is directly wound around the component (102) keeping the carriage (20) stopped in the winding station (S3, S6, S9, S12, S15, S18) and by having a movable finger (57), which engages the wire (15), in a sliding manner, revolve around the component (102) several times.

2. The method according to claim 1, wherein:

a work cycle of the automatic machine (18) lasts from an initial instant, in which the carriage (20) carrying the component (102) devoid of the coil (9-14) reaches the winding station (S3, S6, S9, S12, S15, S18), to a final instant, in which the carriage (20) carrying the component (102) provided with the coil (9-14) leaves the winding station (S3, S6, S9, S12, S15, S18); and the wire (15) is directly wound around the component (102) being made to rotate around the component (102) during a winding step which constitutes a fraction of the work cycle of the automatic machine (18) and has a time duration, ranging from 50% to 70% of a total time duration of the work cycle of the automatic machine (18).

3. The method according to claim 2, wherein the time duration of the winding step, during which the wire (15) is wound around the component (102), ranges from 25% to 40% of a total time duration of the production of the component (102) consisting of several work cycles of the automatic machine (18).

4. The method according to claim 1 and comprising a further step of welding, in a welding station (S4, S7, S10, S13, S16, S19) arranged along the working path (P1) downstream of the winding station (S3, S6, S9, S12, S15, S18), two ends of the coil (9-14) to two electrical contacts (8) available in the component (102).

5. The method according to claim 4, wherein, during the welding, each of the two ends of the coil (9-14) is cut downstream of the weld.

6. The method according to claim 4, wherein the winding station (S3, S6, S9, S12, S15, S18) works in parallel, by winding respective coils (9-14) at the same time, with a first number of components (102), which is an integral multiple relative to a second number of components (102) with which the welding station (S4, S7, S10, S13, S16, S19) works, forming respective welds.

7. The method according to claim 6, wherein the first number ranges from two to ten and, the second number ranges from one to five.

8. The method according to claim 1, wherein winding the wire (15) comprises the further steps of:

locking, before locking the initial end of the wire (15) by means of the first clamp (50), the initial end of the wire (15) also by means of a third clamp (54), which is arranged in a fixed position on an outside of the main conveyor (19) in an area of the winding station (S3, S6, S9, S12, S15, S18) and is aligned with the first clamp (50); and locking, after having locked the final end of the wire (15) by means of the second clamp (51), the final end of the wire (15) also by means of a fourth clamp (55), which is arranged next to the third clamp (54) in a fixed position on the outside of the main conveyor (19) in the area of the winding station (S3, S6, S9, S12, S15, S18) and is aligned with the second clamp (51).

9. The method according to claim 1, wherein winding the wire (15) comprises the further steps of:

placing the movable finger (57) with a horizontal orientation when the wire (15) must be vertically moved in order to get close to the component (102) or in order to move away from the component (102); and placing the movable finger (57) with a vertical orientation when the wire (15) must be horizontally moved in order to be wound around the component (102).

10. The method according to claim 1, wherein winding the wire (15) comprises the further steps of:

bending, before starting to wind the wire (15), the wire (15) vertically moving towards the component (102) around a first pin (16), which horizontally projects from the component (102), in order to cause the wire (15) to make a turn, which deflects the wire (15) towards a horizontal orientation; and bending, after having finished winding the wire (15), the horizontally arranged wire (15) around a second pin (17), which horizontally projects from the component (102) in order to cause the wire (15) to make a turn, which deflects the wire (15) towards a vertical orientation.

11. The method according to claim 1, wherein the main conveyor (19) comprises:

an annular guide (28);

a slide (29), which is coupled to the guide (28) so as to freely slide along said guide (28) and supports the carriage (20); and a linear electric motor (30), which moves the slide (29) and is provided with an annular stator (31), which is arranged in a fixed position along the guide (28) and with a movable slider (32), which is electromagnetically coupled to the stator (31) so as to receive, from the stator (31), a driving force and is rigidly connected to the slide (29).

12. The method according to claim 1, wherein the wire (15) has a diameter ranging from 50 to 200 microns.

13. A method to manufacture a coil (9-14) around a component (102) of an article (100) using an automatic machine (18) and comprising the steps of:

moving, by means of a main conveyor (19) and along a working path (P1), a carriage (20) provided with a seat (22, 23, 24) designed to house the component (102);

placing, in an input station (S1) arranged along the working path (P1), the component (102) in the seat (22, 23, 24) of the carriage (20); and coupling, in a winding station (S3, S6, S9, S12, S15, S18) arranged along the working path (P1) downstream of the input station (S1), a wire (15) around the component (102) in order to obtain a series of turns making up the coil (9-14);

wherein the wire (15) is directly wound around the component (102) keeping the carriage (20) stopped in the winding station (S3, S6, S9, S12, S15, S18) and by having a movable finger (57), which engages the wire (15), in a sliding manner, revolve around the component (102) several times;

wherein winding the wire (15) comprises the further steps of: bending, before starting to wind the wire (15), the wire (15) vertically moving towards the component (102) around a first pin (16), which horizontally projects from the component (102), in order to cause the wire (15) to make a turn, which deflects the wire (15) towards a horizontal orientation; and bending, after having finished winding the wire (15), the horizontally arranged wire (15) around a second pin (17), which horizontally projects from the component (102) in order to cause the wire (15) to make a turn, which deflects the wire (15) towards a vertical orientation.

* * * * *